United States Patent
Ross et al.

(10) Patent No.: US 12,393,887 B2
(45) Date of Patent: Aug. 19, 2025

(54) ROUTE PLANNING AND OPTIMIZATION FOR TRAVELING SALESMAN PROBLEM AND VARIANTS

(71) Applicant: THE UNITED STATES OF AMERICA, AS REPRESENTED BY THE SECRETARY OF THE NAVY, Arlington, VA (US)

(72) Inventors: Isaac M. Ross, Monterey, CA (US); Ronald J. Proulx, Waban, MA (US); Mark Karpenko, Salinas, CA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 464 days.

(21) Appl. No.: 17/170,875

(22) Filed: Feb. 8, 2021

(65) Prior Publication Data

US 2021/0256432 A1    Aug. 19, 2021

Related U.S. Application Data

(60) Provisional application No. 62/971,068, filed on Feb. 6, 2020.

(51) Int. Cl.
*G06Q 30/02*      (2023.01)
*G06F 17/13*      (2006.01)
(Continued)

(52) U.S. Cl.
CPC .......... *G06Q 10/047* (2013.01); *G06F 17/13* (2013.01); *G06Q 10/06315* (2013.01)

(58) Field of Classification Search
CPC ..................................................... G06Q 30/02
(Continued)

(56) References Cited

U.S. PATENT DOCUMENTS 9,494,937 B2 * 11/2016 Siegel .................... G05D 1/104
11,754,408 B2 * 9/2023 Seegmiller ........ B60W 60/0015
                                                              701/25
(Continued)

OTHER PUBLICATIONS

Aggarwal A, Coppersmith D, Khanna, S, Motwani R, Schieber B (Dec. 1, 1999) The angular-metric traveling salesman problem. Siam J. Comput.29(3):697-711.

(Continued)

*Primary Examiner* — Afaf Osman Bilal Ahmed
(74) *Attorney, Agent, or Firm* — Heber Martin Carbajal; Scott Bell

(57) ABSTRACT

The invention relates to route planning and optimization. In some embodiments, the invention includes obtaining vertex data describing target attributes, including at least one target location, and process dynamics data describing system constraints of a process: defining vertex functionals, describing attribute requirements, and edge functionals, which use the system constraints to determine cost requirements, for cost objectives; and using the data, the functionals, and the cost objectives to construct a T-graph that includes a label space representing the target attributes. Next, the T-graph is solved to construct a label space trajectory by determining waypoints such that the process (1) travels through all target locations and (2) satisfies the attribute requirements, dynamically calculating travel cost by applying the cost requirements to each intervening edge, and minimizing the travel cost according to the cost objectives. The optimal space trajectory is executed to navigate the process through the target locations.

30 Claims, 10 Drawing Sheets

(51) Int. Cl.
*G06Q 10/047* (2023.01)
*G06Q 10/0631* (2023.01)

(58) Field of Classification Search
USPC .................................................. 705/14, 14.02
See application file for complete search history.

(56) References Cited

U.S. PATENT DOCUMENTS

2008/0275643 A1* 11/2008 Yaqub ................. G01C 21/343
340/995.19
2014/0214373 A1* 7/2014 Jardin .................. G06T 11/206
703/2
2018/0051998 A1* 2/2018 Stephens .............. G08G 1/0129

OTHER PUBLICATIONS

Arkin EM, Hassin R (Dec. 13, 1994) Approximation algorithms for the geometric covering salesman problem. Discrete Appl. Math. 55(3):197 218.
Chowdhury S, Marufuzzaman M, Tune H, Biau L, Bullington W ( Jul. 2019) A modified ant colony optimization algorithm to solve a dynamic traveling salesman problem: A case study with drones for wildlife surveillance. J Comp. Design and Engr.6(3):368-386.
Dantzig G, Fulkerson R, Johnson S ( Nov. 1954) Solution of a large-scale traveling-salesman problem. J Oper. Res.Soc of America 2(4):393-410.
Flood MM (Feb. 1956) The traveling salesman problem. Oper. Res. 4(1):61-75.
Gentilini I, Margot F, Shimada K (Apr. 2013) The traveling salesman problem with neighborhoods: MINLP solution. Optimization Methods and Software 28(2):364-378.
Gottlieb Y, Shima T (Nov. 24, 2015) UAV's task and motion planning in the presence of obstacles and prioritized targets. Sensors 15:29734-29764.
Gulczynski DJ, Heath JW, Price CC (Feb. 25, 2006) The close enough traveling salesman problem: A discussion of several heuristics. Alt FB, Fu MC Golden BL ed. Perspectives in Op Res.: Papers in Honor of Saul Gass' 80th Birthday (Springer, Boston) 271-283.
Gunawan A, Hoong CL, Vansteenwegen P (Dec. 2016) Orienteering Problem: A survey of recent variants, solution approaches and applications. European J. Op Res.255:315-332.
Ma X, Castanon DA (Dec. 13-15, 2006) Receding horizon planning for Dubins traveling salesman problems. Proc. 45th IEEE CDC 5453-5458.
Miller CE, Tucker AW, Zemlin RA (Jan. 1960) Integer programming formulations and traveling salesman problems. J. ACM 7, 326-329.
Rana J, Anand S, Bose S (May 10, 2019) Optimal search strategy for finding transients in large-sky error regions under realistic constraints. The Astrophysical Journal 876(2):104.
Ross IM (Jul. 2019) An optimal control theory for nonlinear optimization. J Computational and Appl. Math. 354:39-51.
Ross IM, Karpenko M (Oct. 25, 2012) A review of the pseudospectral optimal control: From theory to flight. Annual Reviews in Control 36:182-197.
Ross IM, Proulx RJ, Karpenko M (Jul. 10-12, 2019) Autonomous UAV sensor planning, scheduling and maneuvering: An obstacle engagement technique. ACC 65-70.
Schneider M, Stenger A, Goeke D (Nov. 2014) The electric vehicle-routing problem with time windows and recharging stations. Transportation Sc 48(4):500-520.
Sciarretta A., Back M, Guzzella L (May 2004) Optimal Control of parallel hybrid electric vehicles. IEEE Tran. Control Sys. Tech 12(3):352-363.
Von Stryk O, Glocker M (Jan. 2001) Numerical mixed-integer optimal control and motorized traveling salesmen problems. J. Europeen des Systemes Automatises (European Journal of Control) 35(4):519-533.
Vidal T (Jul.-Aug. 2017) Node, edge arc routing and turn penalties: Multiple problems-one neighborhood extension. Op. Res. 65(4):992-1010.
Wang X, Golden B, Wasil E (Jan. 2019) A Steiner zone variable neighborhood search heuristic for the close-enough traveling salesman problem. Computers and Op Res. 101:200-219.
Witze A (Jul. 19, 2018) Jupiter has 10 more moon we didn't know about—and they're weird. Nature 559:312-313.

* cited by examiner

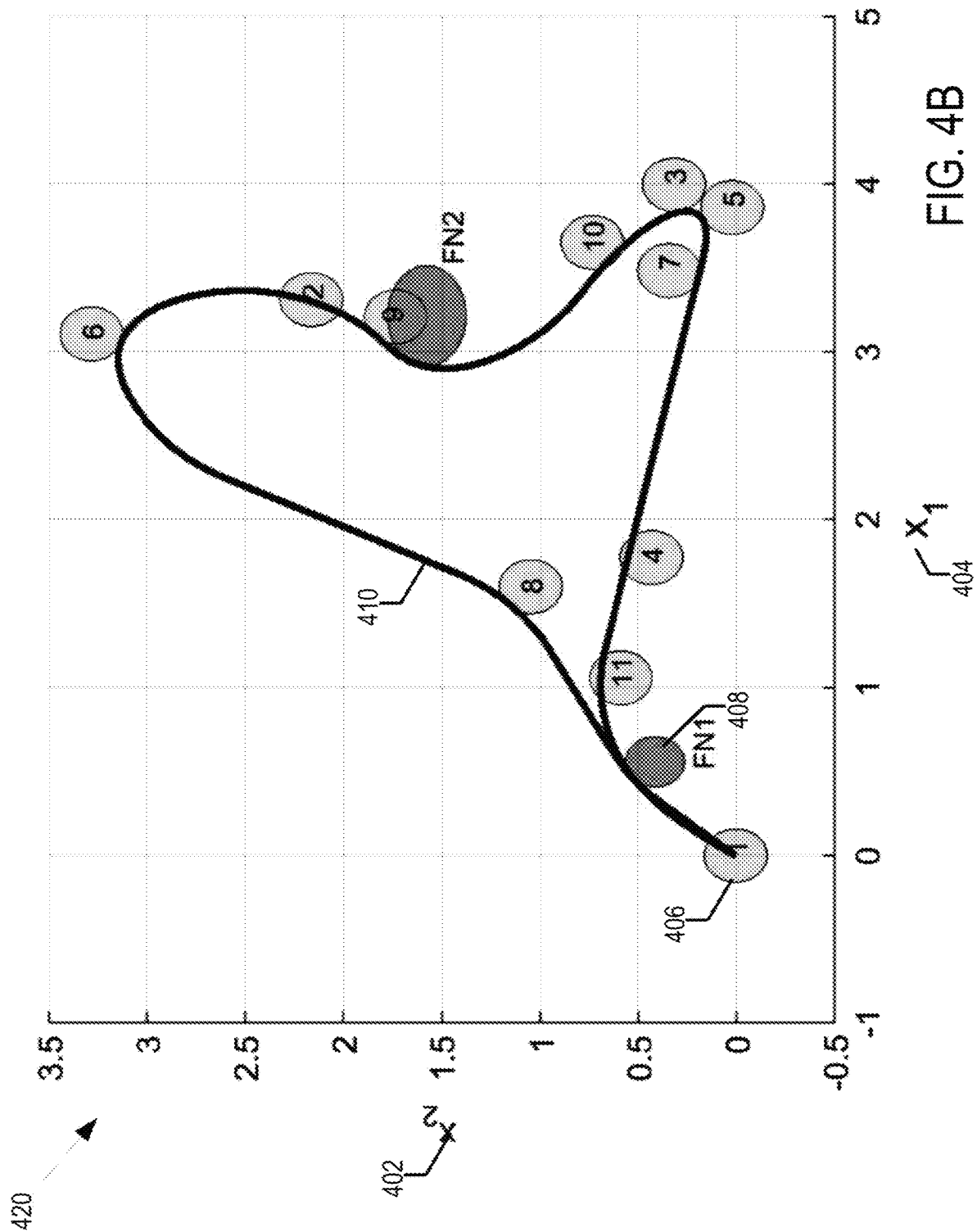

ROUTE PLANNING AND OPTIMIZATION FOR TRAVELING SALESMAN PROBLEM AND VARIANTS

CROSS-REFERENCE TO RELATED APPLICATIONS

This application claims the benefit of U.S. Provisional Application No. 62/971,068, filed Feb. 6, 2020, which is hereby incorporated in its entirety by reference.

BACKGROUND OF THE INVENTION

1. Field of the Invention

The present invention relates generally to methods and systems for route planning and optimization for traveling salesman problem and its variants.

2. Description of the Related Art

The traveling salesman problem (TSP) can be stated as identifying a shortest route to visit all locations and then return to the original location. Historically, the TSP has been solved using a brute-force approach (i.e., N! permutations), graphical techniques, a branch and bound method, heuristics, genetic algorithms, neural networks, etc. Variants of the TSP exist including, but not limited to, metric TSP, Euclidean TSP, maximum asymmetric TSP, no repeating visits TSP, repeating visits TSP, analyst's TSP, etc.

Recently, it was shown that a continuous-variable, non-linear static optimization problem can be framed as a dynamic optimization problem. In this theory, a generic point-to-set algorithmic map is defined in terms of a controllable continuous-time trajectory, where the decision variable is a continuous-time search vector. Starting with this simple idea, many well-known algorithms, such as the gradient method and Newton's method, can be derived as optimal controllers over certain metric spaces. If the control is set to the acceleration of a double-integrator model, then a similar theory generates accelerated optimization techniques such as Polyak's heavy ball method and Nesterov's accelerated gradient method.

SUMMARY OF THE INVENTION

Embodiments in accordance with the invention relate to a method and system for route planning and optimization. In some embodiments, the method includes obtaining vertex data and process dynamics data for a requested route plan, where the vertex data describes target attributes, and where the process dynamics describes system constraints of a process for executing the route plan; defining vertex functionals and edge functionals for cost objectives based on the vertex data and process dynamics data, where the vertex functionals describes attribute requirements of the target attributes, where one or more of the target attributes are target locations, and where the edge functionals use the system constraints of the process to determine cost requirements of edges between the target attributes; and using the vertices and process dynamics data, the vertex and edge functionals, and the cost objectives to construct a T-graph, where the T-graph comprises a label space that represents the target attributes. The T-graph is solved to construct a label space trajectory within the label space, where constructing the label space trajectory by determining waypoints for the label space trajectory such that the process (1) travels through all target locations and (2) satisfies the attribute requirements of each of the target locations, dynamically calculating travel cost as the waypoints are determined by applying the cost requirements to each intervening edge, and minimizing the travel cost according to the cost objectives to identify an optimal label space trajectory. The optimal space trajectory is executed to navigate the process through the target locations.

BRIEF DESCRIPTION OF THE DRAWINGS

FIGS. 4A-4C show numerical examples for route planning and optimization in accordance with embodiments.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide route planning and optimization.

Embodiments described here frame optimization problems in terms of an optimal control problem. More specifically, a menu of modifications are performed to the TSP and its variants to address a class of combinatorial optimization problems. To motivate the new mathematical paradigm, consider the following difficulties that were overcome.

If the vertices in a TSP graph are cities equipped with the power of the continuum, it is difficult to determine how to define the distance between the two sets. In this scenario, assume the cities to be disjoint sets. Consider a distance function defined by:

$$d(A, B) := \min_{x \in A, y \in B} d(x, y) = \min_{x \in A, y \in B} \|x - y\|_2 \qquad (1)$$

Figure 1A:
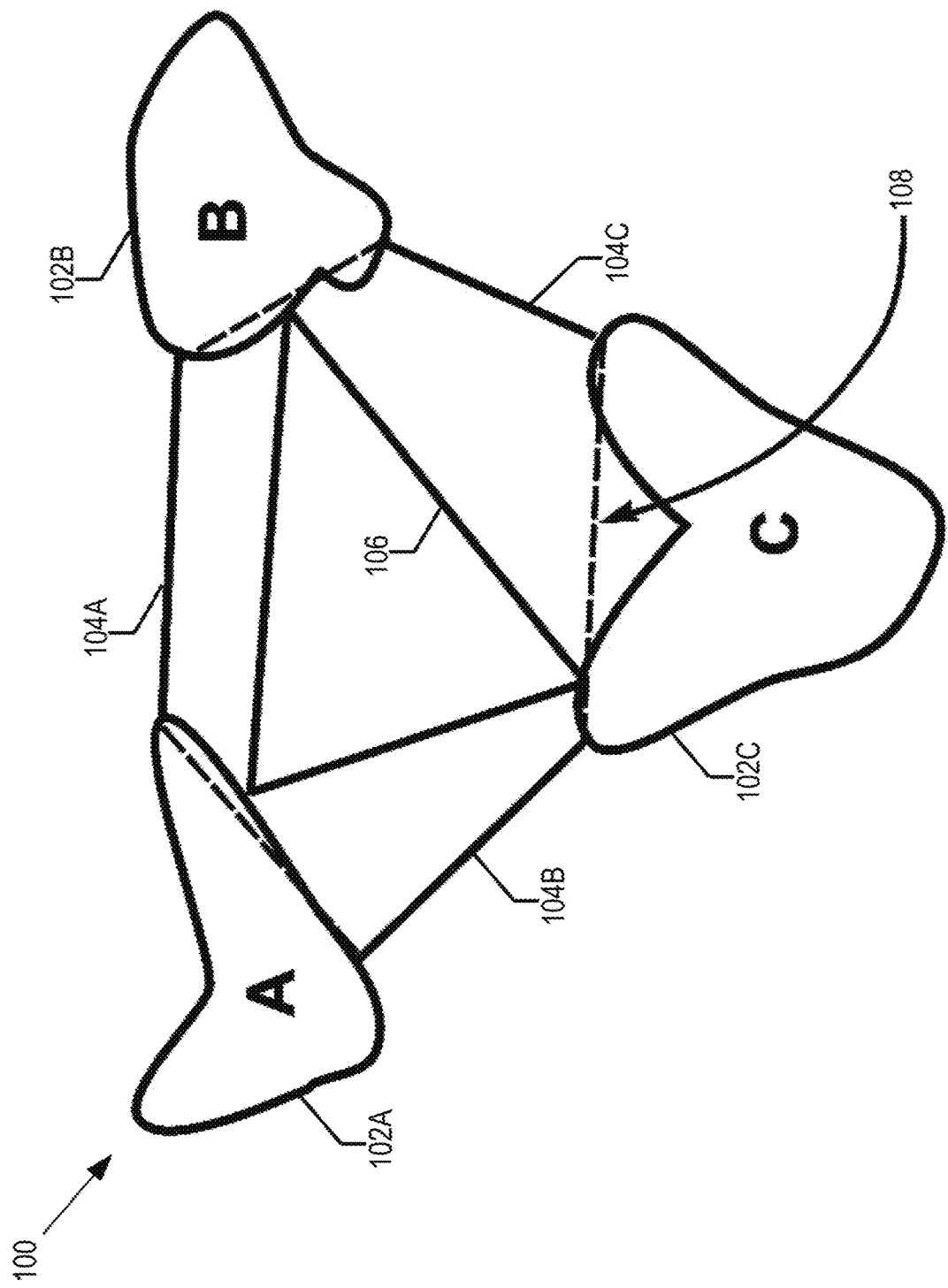
FIG. 1A shows a TSP graph of a three city tour.

Besides the fact that d(A, B) is not a metric, if equation (1) is used to construct the edge weights in the TSP graph, the resulting solution may comprise disconnected segments because the entry and exit points for a city may not necessarily be connected. Adding a "continuity segment" 108 a posteriori does not generate an optimal solution as indicated by the three-city tour 104A-C illustrated in FIG. 1A. This solution is clearly not optimal because the triangle tour 106 shown in FIG. 1A is shorter. In other words, an optimal tour is obtained by not using the shortest distance between two cities 102A-C.

Remark 1. Those skilled in the art will appreciate that the difficulty described above is not centered on solving the problem of the type illustrated in FIG. 1A; rather, this difficulty and others to follow, are focused more fundamentally on simply framing the problem mathematically.

Remark 2. It is apparent by a cursory examination of FIG. 1A that the values of the arc weights are not independent of the path. That is, the objective function in the TSP must somehow account for the functional dependence of the sequence of cities in the computation of the distance between any two cites.

A second difficult arises if the entry and exit points of the cities are constrained by some angle requirement. This second difficulty was first considered when the cities are points, but embodiments herein also address the additional issues when the cities are multi-dimensional rather than points as shown in FIG. 1A. A third difficulty arises if a no-drive, no-fly zone, or other similar keep out zone exists between two cities. It is apparent that any difficulty encountered in addressing the second and third difficulties is further amplified by the issues resulting from the discussions related to the first difficulty. A fourth difficulty exists if you consider neighborhoods that are in deterministic motion.

Assuming the preceding difficulties can be addressed, there is no guarantee that distance is a correct measure for a minimum-time TSP (with neighborhoods). The proper mathematical problem formulation for a minimum-time TSP can be determined as described herein.

Figure 1B:
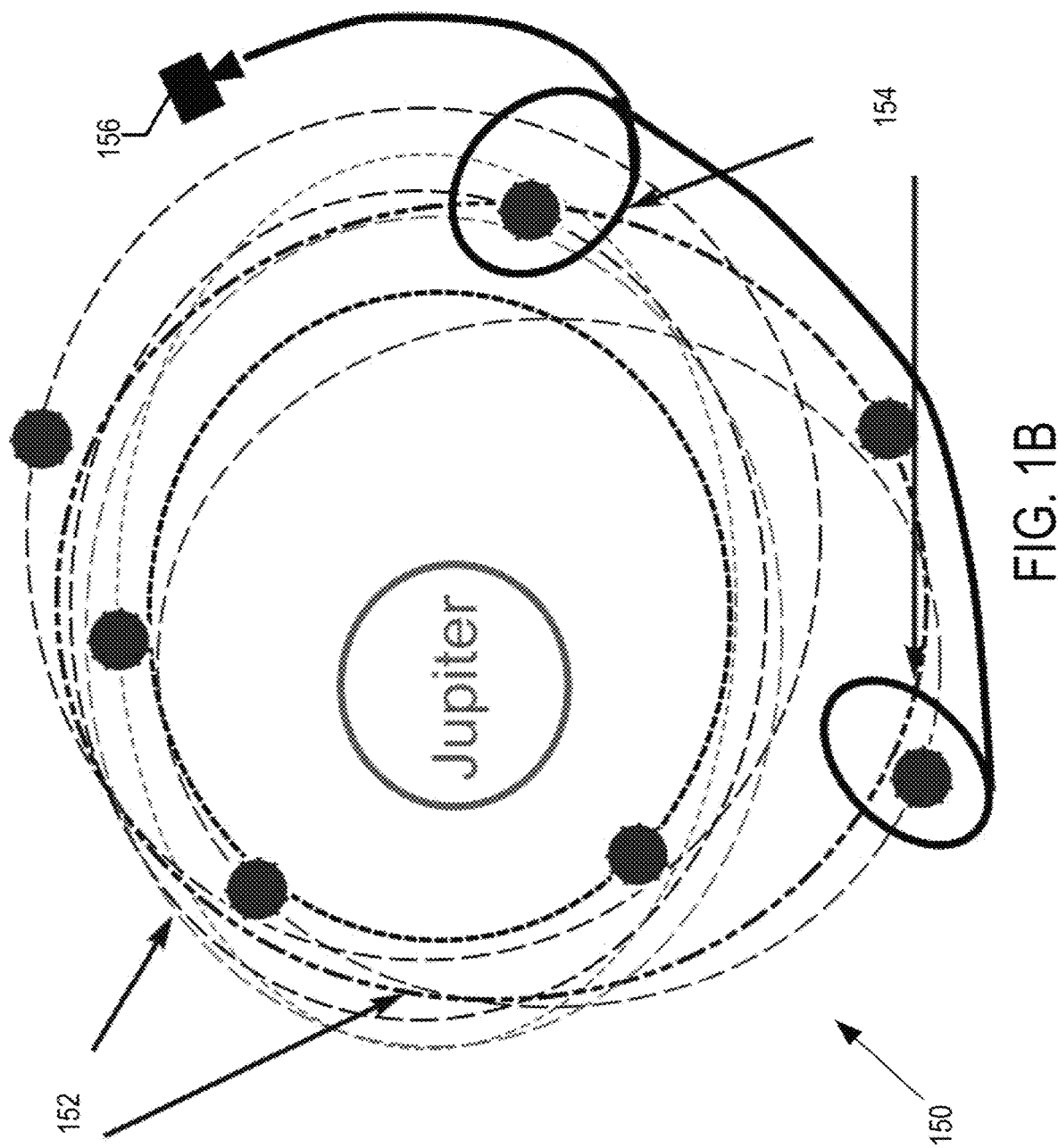
FIG. 1B shows a TSP graph of a Jovian grand tour mission.

While limited versions of the aforementioned difficulties have been addressed using historical methods, the totality of the five difficulties appear in many practical and emerging mathematical problems that lie at the intersection of physics, operations research and engineering science. For example, the problem of touring the 79 moons of Jupiter by a remote sensing spacecraft 156 has all the elements of these difficulties as shown in FIG. 1B. Relative orbits 154 around the moons are the "cities" 154 and the spacecraft is the "traveling salesman" 156 as shown in FIG. 1B. The moons are in various non-circular orbits 152. The measure of "distance" (i.e., weights) is the amount of propellant it takes to transfer the spacecraft between two (moving) relative orbits 154. The objective of a grand tour mission is to maximize the science return by orbiting around as many moons as possible under various constraints arising from the physics of gravitational motion, electromagnetic instrumentation, thermodynamics, electrical power, dollar cost and lifetime of the spacecraft. Not all visits to the moons are valued equally by the science team. It is clear that modeling this optimization problem using the available constructs of a TSP is neither apparent nor easy. In fact, the computation of the weights associated with the arcs of the graph (that represent the transfer trajectories) involve solving a constrained, nonlinear optimal control problem with variable endpoints. Consequently, even generating the data to define this problem as a standard TSP is a nontrivial task.

Embodiments herein describe a new methodology for addressing a class of information-rich, operations-research-type problems such as the modified TSPs discussed in the preceding paragraphs.

Throughout this description the word functional is used in the sense of mathematical analysis: a mapping from a space of measurable functions to the field of real numbers. The following definitions are used to describe embodiments of the invention.

Definition 1 (F-graph). An F-graph is a finite collection of functionals that constitute the arcs (edges) and vertices of a graph. Let $V^i:\text{dom}(V^i) \to R$, $i \in N_+$ and $E^k:\text{dom}(E^k) \to R$, $k \in N^+$ be a finite collection of functionals, where $\text{dom}(\cdot)$ is the domain of $(\cdot)$, Let F be an F-graph whose vertices and arcs/edges are given by $V^i$ and $E^k$ respectively. From standard graph theory, a walk in F may be defined in terms of an alternating sequence of V- and E-functionals. In order to perform evaluations in F, the following new constructs are also defined.

Definition 2 (F-control). An F-control is a sequence of functions, $(\psi_0, \psi_1, \ldots, \psi_n)$ $n \in N$, where each $\psi_j$, $j=0, \ldots, n$ is selected from the domain of $V_i$ or the domain of $E_k$.

Remark 3. An F-control involves two simultaneous actions: selecting functions from the domain of the functionals that comprise F, and ordering the selections in some sequence. Thus, different selections ordered the same way is a different F-control. Conversely, the same selection ordered differently is also a different F-control (provided the reordering is consistent with the selection process).

Definition 3 (Control Walk), A control walk (in F) is an F-control with the following property: $\psi_j \in \text{dom}(E^k) \Rightarrow \psi_{j-1} \in \text{dom}(V^l)$ and $\psi_{j+1} \in \text{dom}(V^m)$, and $E^k$ is the arc/edge that joins $V^l$ to $V^m$. The preceding definition of a control walk requires a sequence of at least three functions. In order to complete this definition and accommodate certain special situations, a trivial control walk is defined below.

Definition 4 (Trivial Control Walk). A control walk $\omega_c$ is said to be trivial if:
1. $\omega_c = (\psi_0)$ and $\psi_0 \in \text{dom}(V^i)$ for some $i \in N$; or,
2. $\omega_c = (\psi_0, \psi_1)$ and $\psi_0 \in \text{dom}(V^i), \psi_1 \in \text{dom}(E^k) \lor (\psi_0 \in \text{dom}(E^k), \psi_1 \in \text{dom}(V^i)$ for some i, k in $N_+$ and $E^k$ joins $V^i$ with itself or with some other vertex;

or

3. $\omega_c = (\psi_0, \psi_1, \psi_2)$ and
$\psi_0 \in \text{dom}(E^k), \psi_1 \in \text{dom}(V^i), \psi_2 \in \text{dom}(E^m)$
for some i, k, m in $N_+$, where $E^k$ and $E^m$ join $V^i$ with itself or with some other vertex.

Remark 4. Let G be a graph that is isomorphic to an F-graph. Furthermore, let G be such that its vertices and arcs are a selection of functions from the domains of the functionals the constitute the F-graph. Then, by construction, there is an unaccountably infinite set of isomorphic graphs G. A control walk may be interpreted as a walk in one of these isomorphic graphs.

It follows from Remarks 3 and 4 that a control walk involves the simultaneous action of choosing an isomorphism and a walk in the chosen isomorphic graph, G.

Definition 5 (Objective Functional). Let $\omega_c$ be a control walk defined over an F-graph. An objective functional is a functional, $\omega_c \to R$, defined over all possible control walks.

Definition 6 (Optimal Control Walk). An optimal control walk is a control walk that optimizes an objective functional.

Remark 5. From Remark 3, it follows that an optimal control walk jointly optimizes the selection of functions from the domains of the functionals that constitute an F-graph as well as the walk itself. This feature of the optimal control walk directly addresses the comments in Remark 2 in the context of FIG. 1A.

For the remainder of this description, the discussions are limited to a special type of an F-graph defined over some measure space L.

Definition 7 (Label Space). A measure space L is called a label space if $L^i$, $i=1, \ldots, |N_v| \in N_+$ are a given finite collection of disjoint measurable subsets of L. Suppose a label space is given. Let, $$L^a := L \setminus \bigcup_{i=1}^{|N_v|} L^i \quad (2a)$$

$$\text{dom}(V^i) := \{\mathbb{R} \to \mathbb{L}^i : \mathbb{R} \to \mathbb{L}^i \text{ is measurable}\} \quad (2b)$$

$$\text{dom}(E^a) := \{\mathbb{R} \to \mathbb{L}^a : \mathbb{R} \to \mathbb{L}^a \text{ is measurable}\} \quad (2c)$$

Definition 8 (T-graph). Let $E^{l,m}$ denote the arcs of an F-graph with the property that $E_{l,m}$ joins $V^l$ to $V^m$ for all l and m in $N_v$. Set $E^{l,m} = E^a$, where the domain of $E^a$ is given by (2c). Set the domains of $V^i$ according to (2b). The resulting F-graph is called a T-graph.

Definition 9 (Label Space Trajectory). A label space trajectory is a measurable function $l(\bullet): \mathbb{R} \supseteq [t_0, t_f] \ni t \to L$ where $t_f - t_0 > 0$ is some non-zero time interval in R.

Proposition 1. A label space trajectory is an F-control for the T-graph.

Proof: Let $l(\bullet): [t_0, t_f] \to L$ be a label space trajectory. Because $L^a$ and $L_i$ are all disjoint sets, it follows that, $$l(t) \in \mathbb{L}^1 \vee \mathbb{L}^2 \vee \ldots \vee \mathbb{L}^{|N_v|} \vee \mathbb{L}^a \text{ for a.a. } t \in [t_0, t_f] \quad (3)$$

As a result, the following construction can be performed: Let, $t_0 < t_1, < \ldots, < t_n < t_{n+1} = t_f$, be an increasing sequence of clock times such that for each $j = 0, 1, \ldots, n, n \in N, (t_{j+1} - t_j)$ is the maximum time duration for which it follows that, $$l(t) = \in \begin{cases} \mathbb{L}^i & \text{for some } i \in N_v \text{ and for a.a. } t \in (t_j, t_{j+1}) \\ & \text{or} \\ \mathbb{L}^a & \text{for a.a. } t \in (t_j, t_{j+1}) \end{cases} \quad (4)$$

The feasibility of constructing (4) follows from (3). Let, $$\psi_j := l(\bullet)|_{(t_j, t_{j+1})}, j = 0, 1, \ldots, n \quad (5)$$

be the restrictions of $l(\bullet)$ to $(t_j, t_{j+1})$ for $j = 0, 1, \ldots, n$. Then, by (4) and (5), it follows, $$\text{Im}(\psi_j) \subseteq \mathbb{L}^i \vee \mathbb{L}^a \text{ for some } i \in N_v \text{ and } \forall j = 0, 1, \ldots, n \quad (6)$$

Hence from (2), it follows that, $$\psi_j \in \text{dom}(V^i) \vee \text{dom}(E^a), \text{ for some } i \in N_v$$

Consequently the sequence $(\psi_0, \ldots, \psi_n)$ is an F-control for the T-graph.

Definition 10 (Trivial Label Space Trajectory). A label space trajectory is said to be trivial if $\text{Im}(l(\bullet)) \subseteq L^a$.

Theorem 1. A nontrivial, continuous label space trajectory generates a control walk in a T-graph.

Proof: Let $\psi_j, j = 0, \ldots, n \in N$ be the restrictions of $l(\bullet)$ as defined by (5). By Proposition 1, $\langle \psi_0, \psi_1, \ldots, \psi_n \rangle$ is an F-control; hence, any given $\psi_j$ is either in the domain of $E^a$ or of $V^i$, for some $i \in N_v$. The rest of the proof is broken down to three cases:

Case(a): $n \geq 2$ and $\psi_j \in \text{dom}(E^a)$ for some $0 < j < n$.
From (4) and (5) the following conditions are obtained:
1. $\psi_{j-1} \in \text{dom}(V^l)$ for some $l \in N_v$
2. $\psi_{j+1} \in \text{dom}(V^m)$ for some $m \in N_v$ Hence, $\langle \psi_{j-1}, \psi_j, \psi_{j+1} \rangle$ is a control subwalk.

Case(b): $n \geq 2$ and $\psi_j \in \text{dom}(V^i)$ for some $0 < j < n$ and some $i \in N_v$.

By continuity of $l(\bullet)$, it follows that.

$$\lim_{t \uparrow t_{k+1}} \psi_k(t) = \lim_{t \downarrow t_{k+1}} \psi_{k+1}(t), k = 0, \ldots, n \quad (7)$$

Setting $k = j-1$ and $k = j$ in (7) the two continuity conditions are arrived at, $$\lim_{t \uparrow t_j} \psi_{j-1}(t) = \lim_{t \downarrow t_j} \psi_j(t) \quad (8a)$$

$$\lim_{t \uparrow t_{j+1}} \psi_j(t) = \lim_{t \downarrow t_{j+1}} \psi_{j+1}(t) \quad (8b)$$

Hence, from (2c), (2b), (4) and (5), it follows that, $$\psi_{j-1} \in \text{dom}(E^a) \text{ and } \psi_{j+1} \in \text{dom}(E^a) \quad (9)$$

If $n = 2$ ($\Rightarrow j = 1$), a trivial control walk is obtained. If $j > 1$, by using the same arguments as in Case(a), $\psi_{j-2} \in \text{dom}(V^k)$ is obtained for some $l \in N_v$ and $\psi_{j+2} \in \text{dom}(V^m)$ for some $m \in N_v$; hence, $\langle \psi_{j-2}, \psi_{j-1}, \psi_j, \psi_{j+1}, \psi_{j+2} \rangle$ is a control sub-walk.

Case(c): $n < 2$.
By similar arguments as in Case (a) and (b), it is straight-forward to show that $\langle \psi_0, \psi_1 \rangle$ is trivial control walk.

From Cases (a), (b) and (c), it follows that $\langle \psi_0, \psi_1, \ldots, \psi_n \rangle, n \in N$ is a control walk.

Two T-Graph-Based Formulations of a TSP.

Let L be a finite dimensional normed space. If $L^i$ is set as the "cities" in L, then a TSP and its many variants may be framed in terms of finding nontrivial optimal label-space trajectories. To illustrate the theoretical simplicity of our approach, $L^i$ is allowed to be time dependent (i.e., in deterministic motion) so that some answers to the difficulties posed above are readily apparent.

Definition 11 (Atomic Return Function). For a fixed time t, an atomic return function $R^i$ is defined by, $$R_a(l, \mathbb{L}^i(t)) \begin{cases} \neq 0 & \text{if } l \in \mathbb{L}^i(t) \\ = 0 & \text{otherwise} \end{cases} \quad (10)$$

Definition 12 (Atomic Return Functional). An atomic return functional $R^i$ is defined by.

$$R^i[l(\bullet), t_0, t_f] := \int_{t_0}^{t_f} R_a(l(t), \mathbb{L}^i(t)) dt \quad (11)$$

where $t_f - t_0 > 0$ is the time horizon of interest.

Atomic return functionals may be used as vertex functionals whenever $l(t) \in L^i(t)$. Whether or not a vertex functional is defined for a given problem, the Kronecker indicator function is defined as, $$\mathcal{I}(l, \mathbb{L}^i(t)) := \begin{cases} 1 & \text{if } l \in \mathbb{L}^i(t) \\ 0 & \text{otherwise} \end{cases} \quad (12)$$

as a fundamental return function. Equation (12) thus generates by way of (11) a fundamental return functional:

Definition 13 (Time-on-Task Functional), A time-on-task functional is defined by, $$T^i[l(\bullet), t_0, t_f] := \int_{t_0}^{t_f} \mathcal{I}(l(t), \mathbb{L}^i(t)) dt \quad (13)$$

Because (13) generates a dwell time over vertex i, a visit is defined in the context of a walk in the following manner:

Definition 14 (Vertex Visit). The vertex i is said to have been visited in $[t_0, t_f]$ if $$T^i[l(\bullet), t_0, t_f] \neq 0 \quad (14)$$

Correspondingly, the vertex i has not been visited if $T^i[l(\bullet), t_0, t_f]=0$.

In the context of a T-graph formulation of a basic TSP, a vertex functional $V^i$ assigns a value of one for a visit, zero otherwise. Furthermore, an arc functional $E^a$ is any functional that assigns a numerical value (of "distance") for segments of $t \to l$ that are not associated with a vertex. If a visit is preceded and followed by an arc functional with no other visits of a vertex in between (including itself), vertex i has been visited once. In this context, $l(\bullet)$ is Hamiltonian if all vertices are visited exactly once.

A Derivative-Based Formulation of a TSP.

Lemma 1. Let $D^i[l(\bullet), t_0, t_f]$ be the functional defined by, $$D^i[l(\cdot), t_0, t_f] := \int_{t_0}^{t_f} |d_t \mathcal{I}(l(t), \mathbb{L}^i(t))| dt \qquad (15)$$

where, $d_t$ denotes the distributional derivative with respect to t. Let $l(\bullet):[t_0, t_f] \to L$ be a continuous label space trajectory such that $T^i[l(\bullet)t_0, t_f] \neq 0$. Furthermore, let $l(t_0) \notin L^i(t_0)$ and $l(t_f) \notin L^i(t_f)$. Then, $$D^i[l(\bullet), t_0, t_f] \in 2\mathbb{N}_+ \qquad (16)$$

Proof: Consider the time intervals $\Delta t_{out}$ and $\Delta t_{in}$ defined by, $$\Delta t_{out} := \{t \in ([t_0, t_f]: \mathcal{I}(l(t), \mathbb{L}^i(t))=0\} \, \Delta t_{in} := \{t \in [t_0, t_f]: \mathcal{I}(l(t), \mathbb{L}^i(t))=1\} \qquad (17)$$

By assumption $T^i[l(\bullet), t_0, t_f] \neq 0$; hence, $\mu(\Delta t_{in}) > 0$. Likewise, $\mu(\Delta t_{out}) > 0$. Hence, it follows that, $$\frac{d\mathcal{I}(l(t), \mathbb{L}^i(t))}{dt} = 0 \, \forall \, t \in \{\text{int}(\Delta t_{out})\} \cup \{\text{int}(\Delta t_{in})\}$$

where, $\text{int}(\bullet)$ denotes the interior of the set $(\bullet)$. Let $t_x \in \partial \Delta t_{int}$ where $\partial(\bullet)$ denotes the boundary of the set $(\bullet)$. Then, the distributional derivative of the function $t \to I(l(t), L^i(t))$ may be written as, $$d_t \mathcal{I}(l(t), \mathbb{L}^i(t)) = -\delta(t-t_x) \vee \delta(t-t_x) \qquad (18)$$

where, $\delta(t-t_x)$ is the Dirac delta function centered at $t=t_x$. Hence, $$|d_t \mathcal{I}(l(t), \mathbb{L}^i(t))| = \delta(t-t_x) \qquad (19)$$

Because $l(t_0)$ and $l(t_f)$ are not in $L^i(t_0)$ and $L^i(t_f)$ respectively, integrating (19) results in, $$\int_{t_0}^{t_f} |d_t \mathcal{I}(l(t), \mathbb{L}^i(t))| dt \in 2\mathbb{N}_+$$

where, the fact that the integral of a delta function is unity is used.

Corollary 1. If $l(t_0) \in L^i(t_0)$ and $l(t_f) \in L^i(t_f)$, then (16) generalizes to $D^i[l(\bullet), t_0, t_f] \in 2\mathbb{N}$. If $l(t_0) \in L^i(t_0)$ or $l(t_f) \in L^i(t_f)$, then the statement of Lemma 1 may be further generalized to $D^i[l(\bullet), t_0, t_f] \in \mathbb{N}$.

Theorem 2. Let $l(\bullet):[t_0, t_f] \to L$ be a continuous label space trajectory. Then, $l(\bullet)$ is Hamiltonian if and only if $$D^i[l(\bullet), t_0, t_f] = 2 \, \forall i \in N_v \qquad (20)$$

Proof: If $l(\bullet)$ is Hamiltonian, then every vertex has been visited just once; hence, (20) follows from Lemma 1. If (20) holds, then every vertex has been visited just once in $[t_0, t_f]$ (with the understanding of a visit given by (14)).

Although continuity of a label space trajectory is sufficiently smooth to generate a Hamiltonian cycle (Cf. Theorem 1), the space of absolutely continuous functions is now considered for the convenience of using the derivative of $t \to l$ to define arc lengths. To this end, let $l(t)$ denote the time derivative of $l(t)$; then, a distance functional may be defined according to, $$J_{dist}[l(\cdot), t_0, t_f] := \int_{t_0}^{t_f} \|\dot{l}(t)\| dt \qquad (21)$$

The integrand in (21) is any finite-dimensional norm. If the two-norm is used, then the numerical value of $J_{dist}$ is consistent with the notion of Euclidean distance illustrated in FIG. 1A. Combining (21) with Theorem 2, a shortest distance TSP can be formulated as, $$(D\text{-}TSP) \begin{cases} \text{Minimize} \quad J_{dist}[l(\cdot), t_0, t_f] := \int_{t_0}^{t_f} \|\dot{l}(t)\| dt \\ \text{Subject to} \quad D^i[l(\cdot), t_0, t_f] = 2 \, \forall \, i \in N_v \\ \qquad\qquad l(t_f) = l(t_0) \end{cases} \qquad (22)$$

The last constraint equation, $l(t_f)=l(t_o)$ in (22) simply ensures that the resulting label-space trajectory is a closed control-walk. In comparing it with the various discrete variable optimization formulations of a TSP [5, 7, 15], it is apparent that (22) contains no explicit subtour-type elimination constraints. This is because the (absolute) continuity of the label space trajectory ensures (by Theorem 1) that the closed control-walk generated by (22) is a single Hamilton cycle.

An Integral-Based Formulation of a TSP.

A TSP may also be formulated (in the sense of a T-graph) using the time-on-task functional to construct a new indicator-type functional.

Definition 15 (Control-Walk Indicator Functional). A control-walk indicator functional is defined by, $$W^i[l(\cdot), t_0, t_f] := \begin{cases} 1 & \text{if } T^i[l(\cdot), t_0, t_f] \neq 0 \\ 0 & \text{if } T^i[l(\cdot), t_0, t_f] = 0 \end{cases} \qquad (23)$$

Using $W^i$ as an indicator of a vertex visit, an alternative formulation of a TSP is arrived at:

$$(I\text{-}TSP) \begin{cases} \text{Minimize} \quad J_{dist}[l(\cdot), t_0, t_f] := \int_{t_0}^{t_f} \|\dot{l}(t)\| dt \\ \text{Subject to} \quad W^i[l(\cdot), t_0, t_f] = 1 \, \forall \, i \in N_v \\ \qquad\qquad l(t_f) = l(t_0) \end{cases} \qquad (24)$$

TABLE 1

| No | Entity | Discrete Optimization | T-Graph Formulations |
|----|--------|----------------------|----------------------|
| 1 | optimization variable | discrete | continuous function |
| 2 | cost matrix; i.e., explicit arc/edge weights | required | not required |
| 3 | explicit degree constraints | required | required in (22); not in (24) |
| 4 | explicit subtour elimination constraints | required | not required |

Equations (24) and (22) are identical except for the imposition of degree constraints Formulation (I-TSP) requires that the vertex be visited at least once. A comparison between the T-graph and prior art discrete-variable problem formulations is summarized in TABLE 1. As noted in the second row of TABLE 1, the T-graph formulations do not require the explicit construction of the arc/edge weights; i.e., the cost matrix for the computation of the objective function in the discrete-variable formulation. This data is "generated" simultaneously via (21) as part of the process of solving the problem. That is, in terms of the concepts introduced above, the T-graph formulation incorporates the simultaneous selection of the function sequence and the functions themselves from the domains of the vertex and are functionals.

Remark 6. The T-graph formulations presented in this section are not transformations of the well-established and prior art discrete-optimization models of TSPs; rather, they are a realization and new invention of a fundamentally new domain of analysis.

Sample T-Graph Formulations of Several Variants of a TSP.

Because of the large number of variants of a TSP, the scope of this section is limited to a small sample of selective problems to illustrate several non-exhaustive embodiments of the new modeling framework.

An Orienteering Problem. Let $\sigma^i>0$ be a score or a value associated with each $L^i(t)$. Define a score functional according to:

$$S^i[l(\cdot),t_0,t_f]:=\sigma^i W^i[l(\cdot),t_0,t_f]$$

where, $W^i$ is given by (23). An exemplary orienteering problem (OP) may now be defined as, $$(OP)\begin{cases}\text{Maximize} & \sum_{i\in N_v} S^i[l(\cdot),t_0,t_f] \\ \text{Subject to} & \int_{t_0}^{t_f} 1\,dt \le t_{max} \\ & l(t_0)\in \mathbb{L}^0 \\ & l(t_f)\in \mathbb{L}^{|N_v|}\end{cases} \quad (25)$$

The payoff functional to be maximized is the sum of the score functionals. The maximum allowable time is $t_{max}>0$. The time constraint in (25) is written in terms of the integral of one to merely illustrate the fact that the resource constraint of time to complete is a functional. The domain of $l(\cdot)$ in (25) is the space of continuous functions in accordance with Theorem 1.

An Orienteering Problem with Neighborhoods.

Problem (OP) given by (25) was motivated by the usual orienteering problem discussed in the literature. Using the atomic return function concept introduced in (10), a traversal of a vertex is now scored through a neighborhood based on the values of the atomic return functional (Cf. (11)), Although there are many ways to score a traversal, a problem formulation is illustrated based on the following construction, $$S_{nbd}^i[l(\cdot),t_0,t_f]:=\begin{cases}\sigma^i & \text{if } R^i[l(\cdot),t_0,t_f]\ge r^i \\ 0 & \text{if } R^i[l(\cdot),t_0,t_f]<r^i\end{cases} \quad (26)$$

In (26), $r^i>0$ is a required "revenue" from a visit to $L^i(t)$. If a label-space traversal $t\to l$ across the city does not generate a revenue of at least $r^i$ as measured by the return functional $R^i$, then the salesman gets no commission (i.e., zero score). On the other hand, if the salesman performs a judicious travel through the city to generate a revenue of at least $r^i$, then he is rewarded by $\sigma^i>0$. The salesman makes no extra commission for generating a revenue greater than $r^i$ at $L^i$; i.e., he is encouraged to expand the market by visiting a different city. This situation arises in astronomy where a telescope is required to scan a portion of the sky to collect a specific frequency of electromagnetic (EM) radiation. Scientific value is generated based on the integration of EM collected. A critical amount of EM collection ($r^i$) is necessary to perform useful science. No extra science is generated once the targeted amount $r^i$ is reached; hence, the telescope is awarded $\sigma^i$ for performing a task successfully with no "extra" credit. Thus, the orienteering problem with neighborhoods may be defined according to the methods of the present invention as, $$(OP\text{-}nbd)\begin{cases}\text{Maximize} & \sum_{i\in N_v} S_{nbd}^i[l(\cdot),t_0,t_f] \\ \text{Subject to} & C^k[l(\cdot),t_0,t_f]\le C_{max}^k \ \forall\, k\in N_C \\ & l(t_0)\in \mathbb{L}^0 \\ & l(t_f)\in \mathbb{L}^{|N_v|}\end{cases} \quad (27)$$

In (27), the constraints $C^k[l(\bullet),t_0,t_f]\le C_{max}^k$, $\forall k\in N_C$ are $N_C\subset N$ generic resource constraint, for example maximum allotted time, maximum allotted fuel, etc., where $C_{max}^k>0$ is the maximum "capacity" associated with the k-th resource.

A Fast TSP.

Minimizing distance traveled does not necessarily equate to minimum time; this fact has been known since Bernoulli posed his famous Brachistoehrone problem as a mathematical challenge in the year 1696. In framing a minimum-time TSP, let $\tau^i>0$ be an additional constraint of a minimum required dwell-time over $L^i(t)$. In this case, a fast (i.e., minimum-time) TSP may be framed as follows:

$$(fastTSP)\begin{cases}\text{Minimize} & J_{time}[l(\cdot),t_0,t_f]:=\int_{t_0}^{t_f} 1\,dt \\ \text{Subject to} & T^i[l(\cdot),t_0,t_f]\ge \tau^i \ \forall\, i\in N_v \\ & l(t_f)=l(t_0)\end{cases} \quad (28)$$

For the same reason as the formulation of the constraint in (25), the cost function in (28) is written as an integral to emphasize the fact that the travel-time is a functional. The functional $T^i$ in (28) is given by (13). Furthermore, while the dwell-time constraint in (28) may, in principle, be written as an equality, $T^i[l(\bullet),t_0,t_f]=\tau^i$, the advantage of an inequality is that it allows the solution to satisfy the stipulated requirement without incurring a penalty in performance if it is advantageous to "navigate through a city," or even to revisit an already visited city to find an optimal exit point at an optimal exit time.

Dynamic TSP with Time Windows.

Because $L^i(t)$, $i\in N$ v are "moving cities," dynamic TSPs are explicitly incorporated in all of the preceding problem formulations. These formulations have also implicitly incorporated time windows because of the following argument: Let $t_a^i\in[t_0,t_f]$ and $t_b^i\in[t_0,t_f]$ be two given clock-times associated with each $L^i(t)$ with $t_a^i<t_b^i$. Consider the augmented set defined by, $$\mathbb{L}_{avg}^i(t):=\mathbb{L}^i(t)\times[t_a^i,t_b^i] \quad (29)$$

Then, it is clear that the space defined by, $$\mathbb{L}_{avg}(t):=\mathbb{L}(t)\times[t_0,t_f]$$

is a label space, whose disjoint sets are defined by (29). Hence, by defining a new label-space variable $l_{avg} := (l, t)$, it is apparent that no additional theoretical developments are necessary to incorporate time-window constraints in the proposed T-graph formulations. Furthermore, note that the time window in (29) may itself also vary with respect to time.

In view of economic considerations that go beyond distance and time, a significantly greater degree of flexibility in modeling can be obtained by transforming the preceding T-graph "variational" formulations to their optimal-control versions.

A T-Graph Optimal Control Framework.

By limiting the space of allowable label space trajectories to the space of absolutely continuous functions, it is possible to frame a significantly richer class of traveling-salesman-type problems. To develop this transformed framework, the derivative of l(t) is first set as a candidate optimization variable, $$\dot{l}(t) = w(t) \tag{30}$$

where, $w \in R^{N_l}$, $N_l \in N$ is the label-space tangent control variable. Thus, for example, (28) transforms according to.

$$(fastTSP:OC\text{-}ver) \begin{cases} \text{Minimize} & J_{time}[l(\cdot), w(\cdot), t_0, t_f] := t_f - t_0 \\ \text{Subject to} & \dot{l}(t) = w(t) \\ & T^i[l(\cdot), t_0, t_f] \geq \tau^i \ \forall \ i \in N_v \\ & l(t_f) = l(t_0) \end{cases} \tag{31}$$

In comparing it with (28), note that (31) contains an additional decision variable w(•) and an additional constraint given by (30). This aspect of the transformation may be used advantageously; for example, if the objective functional in (31) is replaced by, $$J_{dist}[l(\cdot), w(\cdot), t_0, t_f] := \int_{t_0}^{t_f} \|w(t)\| dt$$

then, the resulting problem transforms to yet another formulation of a minimum-distance TSP (Cf. Section 3). In fact, the most important aspect of (31) is that it provides a clear avenue for generalization that is conducive to modeling traveling-salesman-type problems driven by constrained, nonlinear dynamical systems.

Generalization Based on Nonlinear Dynamics

Figure 2:
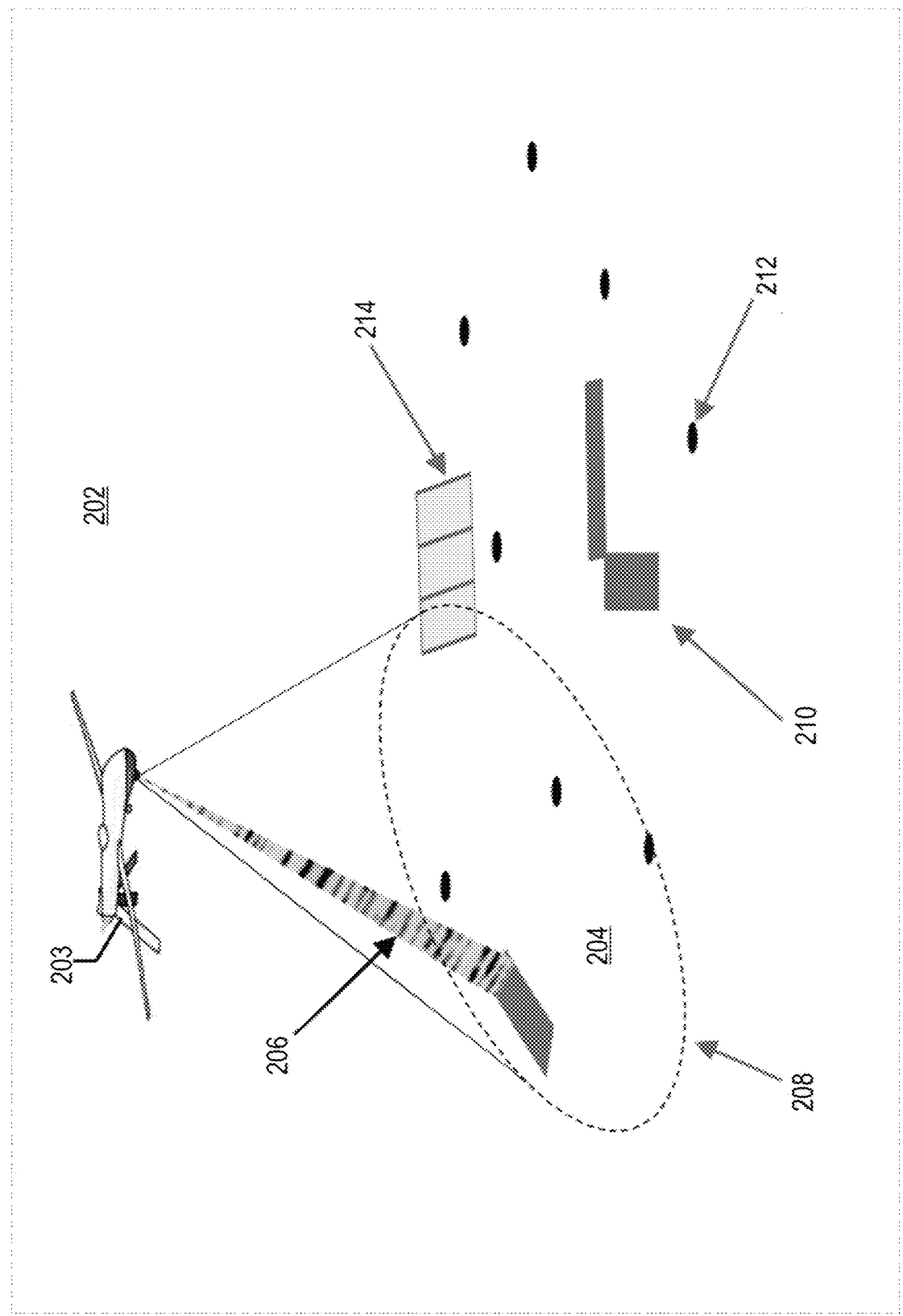
FIG. 2 shows an example of a physical description of state space, label space, and a connexion function.

In many applications such as robotics, the natural home space for the "salesman" is some state space X that is not necessarily the label space. Furthermore, the dynamics of the salesman is given by some nonlinear controllable ordinary differential equation of the type, $$\dot{x} = f(x, u, t) \tag{32a}$$

where, $x \in R^{N_x}$, is a state variable, $u \in R^{N_u}$ is the control variable and $f: R^{N_x} \times R^{N_u} \times R \to R^{N_x}$, is the nonlinear dynamics function. Because all aspects of the problem definition so far are described in terms of a label space, it is necessary to connect it to the state space. Let this connection be given by some algebraic equation, $$g(l, x, t) = 0 \tag{32b}$$

where, $g: R^{N_l} \times R^{N_x} \times R \to R^{N_g}$ is called a connexion function. An example of a physical description of state space 202, label space 204 and the connexion function 206 is illustrated in FIG. 2. In this example, an uninhabited aerial vehicle (UAV) 203 is tasked to collect over a geographic region. The areas of interest vary from a point area 212 to a strip area 210 to a broad area of scan 214. Technical properties associated with the areas of interest 208 are defined in label space 204. The state variables of the UAV 203 is given in terms of its position, velocity and the orientation of the maneuverable camera. The connexion function 206 is the mathematical model that connects the label space variables to the state space variables based on the precise position and orientation of the camera at a given instant of time.

From (32a) and (32b), it follows that (30) may be written implicitly as a differential algebraic equation, $$\left. \begin{array}{l} \dot{x} = f(x, u, t) \\ 0 = g(l, x, t) \end{array} \right\} \Longrightarrow \dot{l} = w \tag{33}$$

The significance of replacing (30) by the state-space representation is that it facilitates a direct means to incorporate the full nonlinear dynamics of a salesman in the optimization problem formulation.

In one embodiment, a state vector for the UAV payload can be defined in terms of the position and velocity of the point about which the camera rotates, i.e., gimbals. The orientation parameters and angular velocity of the camera mounts complete the state vector representation. Thus, it can be seen that the state vector is not an element of the label space defined above. For the problem formulation to be meaningful, the state- and label-space vectors must be related in some manner. To develop general transformational equations that support this concept, the first five elements of the state variable are organized according to equation (34a), $$\begin{pmatrix} x_1 \\ x_2 \\ x_3 \\ x_4 \\ x_5 \end{pmatrix} = \begin{pmatrix} \phi \\ \theta \\ x \\ y \\ z \end{pmatrix} \tag{34a}$$

where, $\phi$ and $\theta$ are the pan and tilt angles of the camera respectively, and x, y and z are the position coordinates of the camera mount. Let $r_{LOS}$ be the vector from the camera to a generic point on the ground $(l^1, l^2, 0)$.

From the triangle relationship between the indicated vectors equation (34b) is obtained as, $$\begin{pmatrix} x \\ y \\ z \end{pmatrix} + r_{LOS} = \begin{pmatrix} l^1 \\ l^2 \\ 0 \end{pmatrix} \tag{34b}$$

From elementary kinematics, equation (34c) is obtained as, $$\begin{aligned} \frac{r_{LOS}}{r_{LOS}} &= (\sin \theta) b_1 - (\sin \phi \cos \theta) b_2 + (\cos \phi \cos \theta) b_3 \\ &= (\sin \theta) n_1 + (\sin \phi \cos \theta) n_2 - (\cos \phi \cos \theta) n_3 \end{aligned} \tag{34c}$$

where, $r_{LOS}$ is the magnitude (2-norm) of $r_{LOS}$. Substituting equation (34c) in equation (34b) results in equation (34d), $$x + r_{LOS} \sin \theta = l^1$$

$$y + r_{LOS} \sin \phi \cos \theta = 0 = l^2$$

$$z - r_{LOS} \cos \phi \cos \theta = 0 \tag{34d}$$

Manipulating equation (34d) to eliminate $r_{LOS}$, equation (34d) reduces to equation (34e), $$x+z \tan \theta/\cos \phi = l^1$$

$$y+z \tan \phi = l^2 \quad (34e)$$

From equation (34a), it can be seen that equation (34e) is of the form shown in equation (34f), $$l = L(x) \quad (34f)$$

where, $L:x \mapsto l$ is an equation designed by an operator of the process that maps a state vector x to a label vector l. In certain problems, it may not be easy to generate an explicit function L. In this case, a more practical state-to-label-space transformational model is given implicitly by the zeros of some function g shown in equation (34g), $$g(x,l) = 0 \quad (34g)$$

where, $g:(x,l) \mapsto \mathbb{R}^{N_g}$, $N_g \in \mathbb{N}$. Equation (34f) is included in equation (34g) with $g(x,l):=L(x)-l$.

Note that equation (34e) was possible because equation (34d) was manipulated to explicitly eliminate $r_{LOS}$ in equation (34d). In certain problems, it may not be possible or even practical to perform such elimination of variables. In such situations, it is more convenient to introduce additional control parameters as part of the totality of control variables $u \in \mathbb{R}^{N_u}$ so that equation (34g) can be further generalized to equation (34h), $$g(x,l,u,t) = 0 \quad (34h)$$

where, also incorporated in g is an explicit dependence on time. The explicit time-dependence of g is quite critical in practical applications. Thus, for this UAV collection tasking, no further effort need be expended past equation (34d) by setting $r_{LOS} = u \in \mathbb{R}$.

In the application of embodiments described herein, it is inadvisable to set $r_{LOS} = u \in \mathbb{R}^3$ and simply use equation (34b). This is because $r_{LOS}$ is functionally dependent on $\phi$ and $\theta$ which were declared to be part of the state variables. In optimal control theory, controls are mathematical variables that do not have time rate (i.e., du/dt) constraints.

Generalization Based on Economics-Driven Cost/Payoff/Constraint Functionals.

As a result of (33), the decision variables expand to the tuple, $(l(\cdot), x(\cdot), u(\cdot), t_0, t_f)$. This can be taken to great advantage by formulating cost, payoff and/or constraint functionals in their more natural "home spaces." For example, in an electric vehicle-routing problem, the capacity constraint of the battery is more naturally expressed as a functional constraint in terms of the state x of the vehicle, $$\int_{t_0}^{t_f} S(x(t))dt \geq C_{safe} \quad (35)$$

In (35), S is the state-of-charge and $C_{safe}$ is a battery charge required for safe operations. In the absence of extending the decision variables to incorporate the state vector, (35) would need to be transformed to a label space constraint using (32a). This difficult task is completely circumvented by incorporating the state vector as part of the optimization variable. The alternative is to generate proxy models as a means to extend the scope of vehicle routing problems.

In (28), the travel time is an implicit functional of the label-space trajectory (•). Replacing (30) by (33), the travel time now becomes an implicit functional of l(•), x(•) and u(•). That is, the functional, $$J_{time}[l(\cdot), x(\cdot), u(\cdot), t_0, t_f] := t_f - t_0 \quad (36)$$

with constraints given by (33) offers a more accurate model of travel time with obvious business implications in practical routing problems. Note that (36) also allows the clock time to be optimized. Equation (36) may be further modified to take into account gas/power consumption depending upon the vehicle type (standard/hybrid/electric). Analogous to (35), gas/power consumption may be written in terms of an integral, $$\int_{t_0}^{t_f} f_0(x(t), u(t), t)dt \quad (37)$$

where, $f_0$ is a function that models the time-varying gas/power consumption rate. This function may be well-modeled using the physics of the automobile power train. A convex combination of (37) with (36) generates the functional, $$J_{hybrid}[l(\cdot), x(\cdot), u(\cdot), t_0, t_f] := \quad (38)$$

$$\alpha(t_f - t_0) + (1-\alpha)\int_{t_0}^{t_f} f_0(x(t), u(t), t)dt \; \alpha \in [0, 1]$$

The parameter $\alpha$ in (38) offers a sliding scale over the "trade-space" of time and energy consumption.

An Optimal Control Framework for a TSP and its Variants.

Substituting (33) in (31) while simultaneously adding additional levels of abstraction for the functionals associated with the vertices and arcs of the underlying T-graph, arriving at:

$$(\mathcal{T}_X P) \begin{cases} \text{Minimize} & J[l(\cdot), x(\cdot), u(\cdot), t_0, t_f] \\ \text{Subject to} & \dot{x}(t) = f(x(t), u(t), t) \\ & g(l(t), x(t), t) = 0 \\ & K^m[l(\cdot), x(\cdot), u(\cdot), t_0, t_f] \begin{cases} \leq 0, & \forall m \in N_{\geq 0} \\ = 0, & \forall m \in N_{=0} \end{cases} \\ & (l(t_0), l(t_f)) \in \mathbb{L}^b \subseteq \mathbb{L} \\ & x(t) \in \mathbb{X}(t) \\ & u(t) \in \mathbb{U}(t, x(t)) \end{cases} \quad (39)$$

In (39), the objective function is simply stated in terms of an abstract functional J, (of which several possible embodiments have already been disclosed in the preceding remarks) in order to facilitate the formulation of a generic cost functional that go beyond those discussed above. Likewise, the functionals $K^m$ in (39) may be time-on-task functionals, walk-indicator functionals, degree functionals, capacity-constraint functionals or some other functionals. Furthermore, because each vertex may have several constraints, the total number of these constraints may be greater than $|N_v|$. The index sets $N_{=0}$ and $N_{\geq 0}$ simply organize the totality of constraint functionals into equalities and inequalities. The set $\mathbb{L}^b \subseteq \mathbb{L}$ stipulates the boundary conditions for the label space trajectory. Also included in (39) are state variable constraints $x(t) \in \mathbb{X}(t)$ and state-dependent control constraints given by $u(t) \in \mathbb{U}(t, x(t))$. Such constraints are included in Problem $(\mathcal{T}_X P)$ because they are critically important in practical applications as well as coordinate transformations of optimal control problems.

Because (39) is a generalization of the problems discussed above, it is evident that a fairly large class of traveling-salesman-like problems can be modeled as instances of Problem ($T_XP$).

Figure 3A:
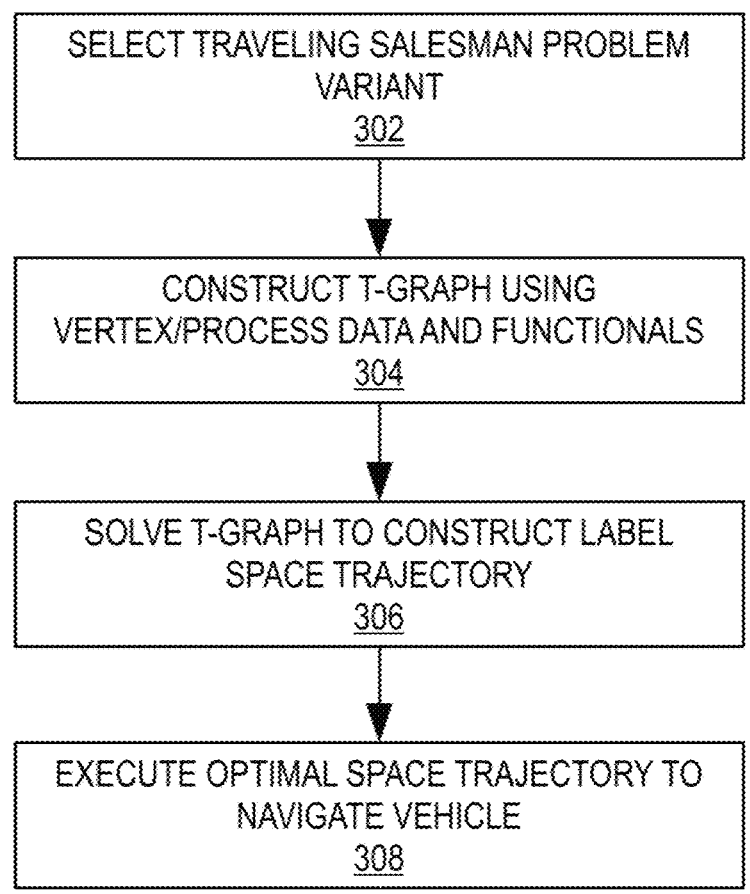
FIGS. 3A-3C show flowcharts for route planning and optimization in accordance with embodiments.
Figure 3B:
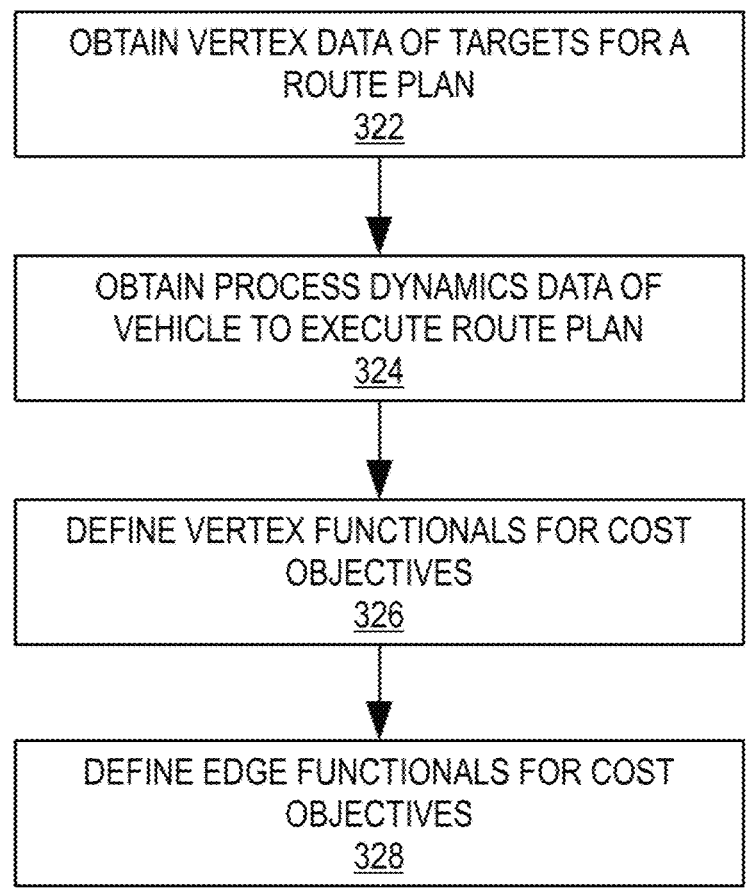
Figure 3C:
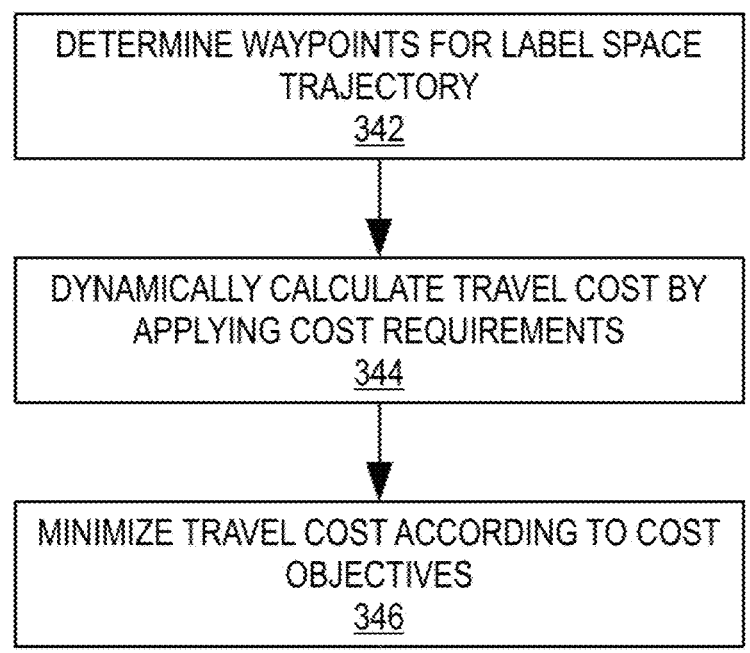

FIGS. 3A-3C show flowcharts 300, 302, 306 for route planning and optimization. As is the case with this and other flowcharts described herein, various embodiments may not include all the steps described below, may include additional steps, and may sequence the steps differently. Accordingly, the specific arrangement of steps shown in FIGS. 3A-3C should not be construed as limiting the scope of route planning and optimization.

FIG. 3A shows a high-level flowchart for constructing an optimal space trajectory to navigate a vehicle. In block 302, a TSP variant is selected for route planning. The TSP variant selected can affect how constraints and cost objectives are defined for the route plan as described above. In block 304, a T-graph is constructed using vertices and process dynamics data, the vertex and edge functionals, and cost objectives. For example, the T-graph can be defined as shown in Equation (39).

In block 306, the T-graph is solved to construct a label space trajectory. In some cases, the T-graph is solved in real-time as a vehicle is navigating through target locations. In these cases, the current position of the vehicle is tracked to sync up with the constructed label space trajectory. When costs of the trajectory are minimized, an optimal label space and in some instances an additional optimal state space trajectory is obtained. In block 308, the optimal label space and/or state space trajectory is executed to navigate the vehicle. For example, the optimal space trajectory can be displayed on a display in the vehicle so that a driver can navigate the vehicle accordingly. In another example, the optimal space trajectory can be used to specify a flight path for an UAV.

FIG. 3B shows a flowchart for constructing a T-graph. In block 322, vertex data of targets is obtained. In block 324, process dynamics data of the vehicle is obtained. The vertex and process dynamics data may be as described above with respect to the optimal control framework.

In block 326, the vertex data is used to define vertex functionals for the cost objectives. The vertex functionals can describe attribute requirements (e.g., time at target, etc.) of the targets. In block 328, the process dynamics data is used to define edge functionals for the cost objectives. The edge functionals use system constraints of the vehicle to determine cost requirements of edges between the target attributes. System constraints can include, but is not limited to, engineering constraints, resource constraints, operational constraints, physics constraints, etc. The data and functionals in block 322-328 are combined to construct the T-graph.

FIG. 3C shows a flowchart for solving a T-graph. In block 342, waypoints for the label space trajectory are determined such that the vehicle (1) travels through all required target locations and (2) satisfies the attribute requirements of each of the target locations. In block 344, travel cost is dynamically calculated as the waypoints are determined by applying the cost requirements to each intervening edge. In block 346, the travel cost is minimized according to the cost objectives to identify the optimal label space trajectory. Blocks 342-346 can be performed iteratively as the current position of the vehicle and/or task requirement(s) changes.

Illustrative Numerical Examples

A motorized TSP was first introduced in [missing ref[. In essence, a motor is a differential equation; hence, a motorized TSP is one with dynamical constraints. Here, this problem is combined with several other variants of the TSP to generate a minimum-time close-enough motorized traveling salesman problem with forbidden neighborhoods given by:

$$l \in \mathbb{R}^4, \quad x \in \mathbb{R}^4, \quad u \in \mathbb{R}^2 \tag{40}$$

$$(fastCEMTSPFN\text{-}1) \begin{cases} \text{Minimize} & J[l(\cdot), x(\cdot), u(\cdot), t_0, t_f] := t_f - t_0 \\ \text{Subject to} & \dot{x}_1(t) = x_3(t), |x_3(t)| \le 1 \ \forall \, t \in [t_0, t_f] \\ & \dot{x}_2(t) = x_4(t), |x_3(t)| \le 1 \ \forall \, t \in [t_0, t_f] \\ & \dot{x}_3(t) = u_1(t), |u_1(t)| \le 1 \ \forall \, t \in [t_0, t_f] \\ & \dot{x}_4(t) = u_2(t), |u_2(t)| \le 1 \ \forall \, t \in [t_0, t_f] \\ & l_i(t) - x_i(t) = 0, \ \forall \, t \in [t_0, t_f] \\ & i = 1, 2, 3, 4 \\ & T^i[l(\cdot), t_0, t_f] \ge \tau^i_{min}, \ \forall \, i = 1, \ldots, N_v \\ & \left(\dfrac{x_1(t) - x_1^i}{a^i}\right)^2 + \left(\dfrac{x_2(t) - x_2^i}{b^i}\right)^2 \ge 1, \\ & \forall \, i = 1, \ldots N_{obs} \\ & (l(t_0), l(t_f)) = (0, 0) \end{cases}$$

It is apparent that (40) is a special case of (39). In fact, it is a generalization of the fast TSP posed in (31). Equation (40) is motorized by the four differential equations resulting from an elementary application of Newtonian dynamics: The position and velocity of the salesman are $(x_1, x_2) \in \mathbb{R}^2$ and $(x_3, x_4) \in \mathbb{R}^2$ respectively. Both the velocity and acceleration $(u_1, u_2) \in \mathbb{R}^2$ vectors are constrained in the $l_\infty$ norm (i.e., components are constrained in terms of their absolute values). The $N_{obs}$ ellipsoidal constraints in (40) are the forbidden neighborhoods whose centroids are given by $(x^i_1, x^i_2)$, $i = 1, \ldots, N_{obs}$. The parameters $a^i > 0$ and $b^i > 0$ determine the shape of the ellipse. The last constraint in (40) requires the salesman to start and end at the origin.

Figure 4A:
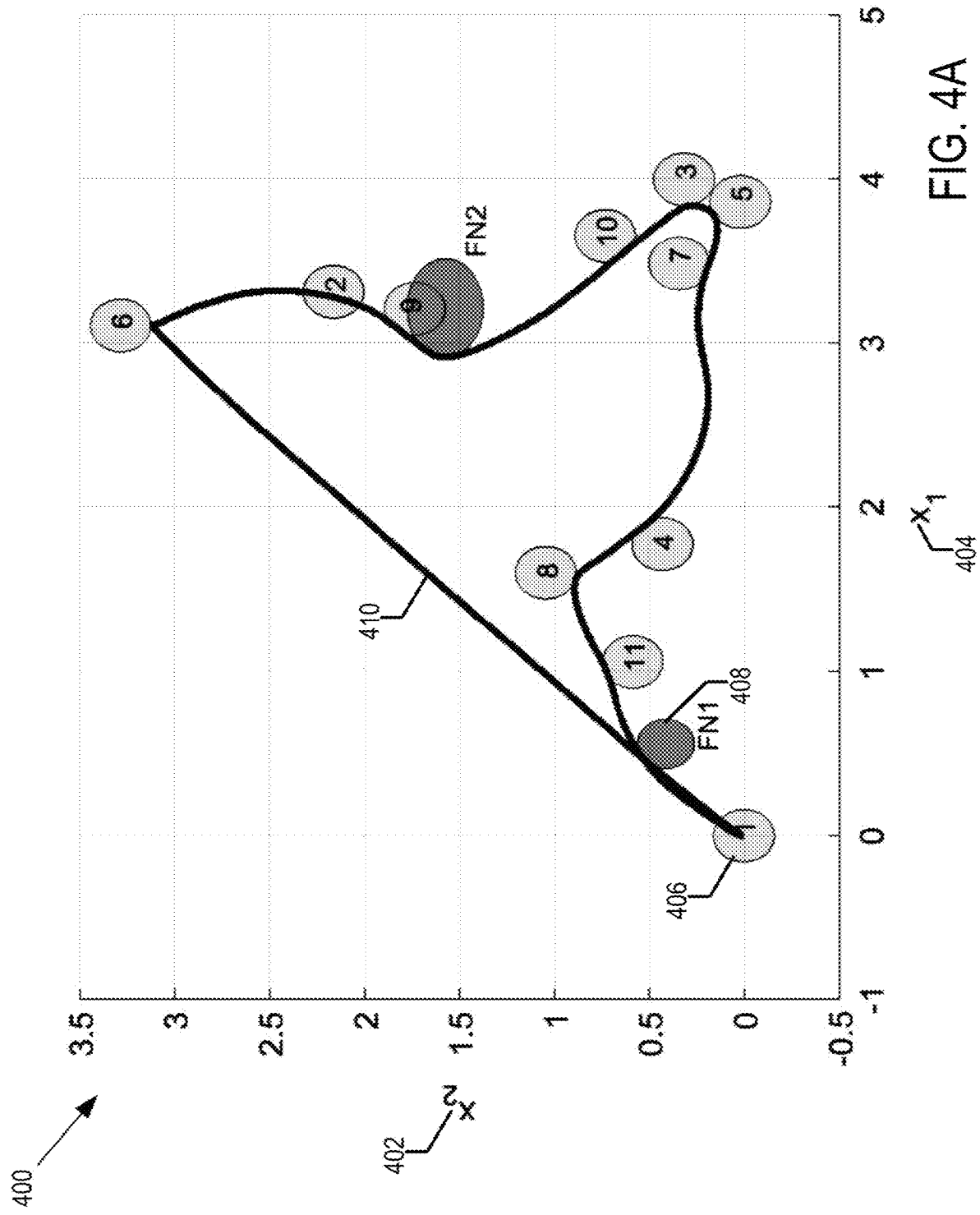

A sample data set for (40) with $N_v = 11$ and $N_{obs} = 2$ is shown in FIG. 4A. Also shown in FIG. 4A is the solution 410 obtained by solving (40) by any appropriate means. Some key points to note regarding the solution 410 presented in FIG. 4A are:

1. Nearly all the "arcs" between city-pairs are curvilinear. This is because the salesman's trajectory 410 is required to satisfy the Newtonian dynamical constraints as well as the instantaneous $l_\infty$ bounds on velocity and acceleration as dictated in (40).
2. The city-pair arcs as well as the entry and exit points to the city are a natural outcome of solving the posed problem (Cf. (40)). That is, the city-pair arcs were not determined either a priori or a posteriori to the determination of the city sequence. See also Remark 2.
3. The ellipsoidal forbidden neighborhood 408 marked FN2 overlaps neighborhood 406 No. 9. Thus, the allowable region for neighborhood No. 9 is nonconvex.

Next, consider a "variant" of (40) obtained by replacing the $l_\infty$ constraints on velocity and acceleration by its $l_2$ version, $$(\text{fastCEMTSPFN-2}): \sqrt{x_3^2(t) + x_4^2(t)} \le 1,$$
$$\sqrt{u_1^2(t) + u_2^2(t)} \le 1 \ \forall t \in [t_0, t_f] \tag{41}$$

That is, Problem (fistCEMUTSPFN-2) is identical to Problem (fastCEMTSPFN-1) except for the additional nonlinear constraint given by (41). A solution 410 to this problem is shown in FIG. 4B. It is apparent that FIG. 4B differs from FIG. 4A in several ways:

1. The turn at neighborhood 406 No. 6 in FIG. 4A is significantly sharper than the corresponding one in FIG. 4B. The curvilinear turn in FIG. 4B is a clear and direct result of the $l_2$ constraint given by (41).

2. The sequence of visits in FIG. 4B is different from that of FIG. 4A; for example, compare the visit to neighborhood 406 No. 8.
3. The entry and exit points to the same numbered cities in FIGS. 4A and 4B are different; for example, compare neighborhoods 406 Nos. 8, 11 and 4.

Figure 4C:
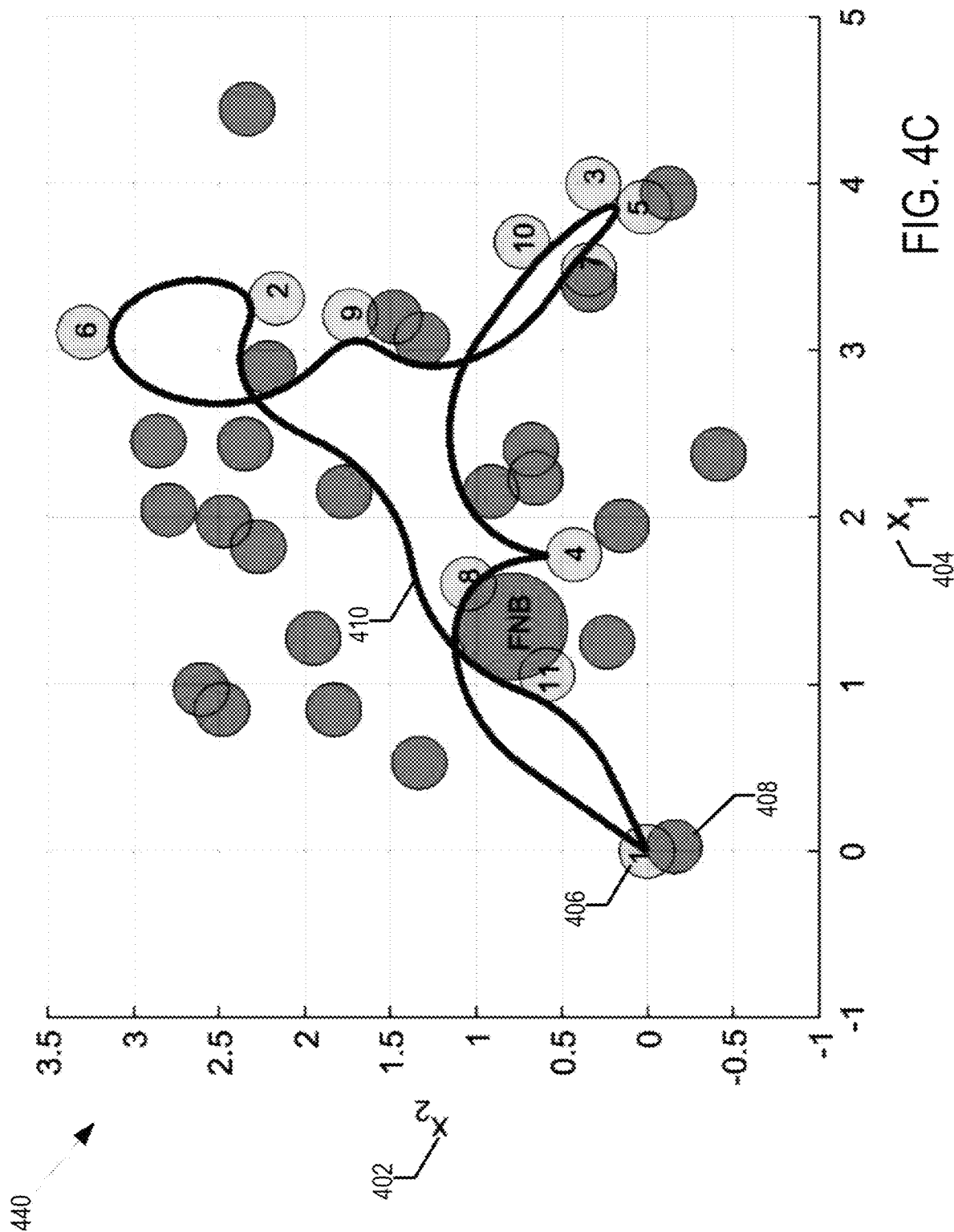

For the third and final case, the problem "data set" is changed with a random distribution of many forbidden zones 408 as shown in FIG. 4C. Only the neighborhood marked "FNB" was not randomly selected; rather, its size and location were purposefully set as indicated in FIG. 4C to generate a more interesting case study. Also shown in FIG. 4C is a solution 410 to the problem whose vehicle is constrained by (41). Beyond the apparent efficacy of the process in obtaining a solution 410, noteworthy points pertaining to FIG. 4C are:

1. Some of the forbidden neighborhoods 408 are nonconvex. The nonconvex sets are generated randomly in the sense that the circular neighborhoods 406 can overlap.
2. Some of the allowable neighborhoods 406 are nonconvex because the forbidden circular disks 408 overlap the allowable regions.
3. Comparing FIGS. 4C and 4B, the addition of forbidden neighborhoods 408 has drastically altered the sequence of visits.

Many types of objective functions and constraints in emerging variations of the traveling salesman problem (TSP) are more naturally defined in their continuous-time home space. Modeling these variants of the TSP using a classic discrete optimization framework is neither straightforward nor easy. By inverting the traditional modeling process, that is, by formulating the naturally discrete quantities in terms of continuous-time nonsmooth functions, it is possible to generate a new framework for the TSP and many of its variants. In this context, the discrete-optimization formalism of a TSP may be viewed as a problem formulation in the co-domain of the functionals that constitute its T-graph. In sharp contrast, the problem formulation presented in the present method is in the domain of the functionals of the TSP T-graph. This perspective suggests that the discrete-optimization- and the variational formulations are effectively two sides of the same T-graph constructs introduced herein.

There is no doubt that there are a vast number of open theoretical issues in the proposed framework. Nonetheless, embodiments herein demonstrate, by way of a fast, close-enough motorized TSP with forbidden neighborhoods, that it is indeed possible to solve some challenging problems using the new formalisms. One of the interesting revelations indicated by the numerical studies is the big impact of seemingly small changes in the motion-constraints of the traveling salesman. This suggests that an exploitation of nonlinear models may provide a discriminating edge to a business/engineering operation by way of a nonintuitive economical utilization of its end-to-end systems.

Figure 5:
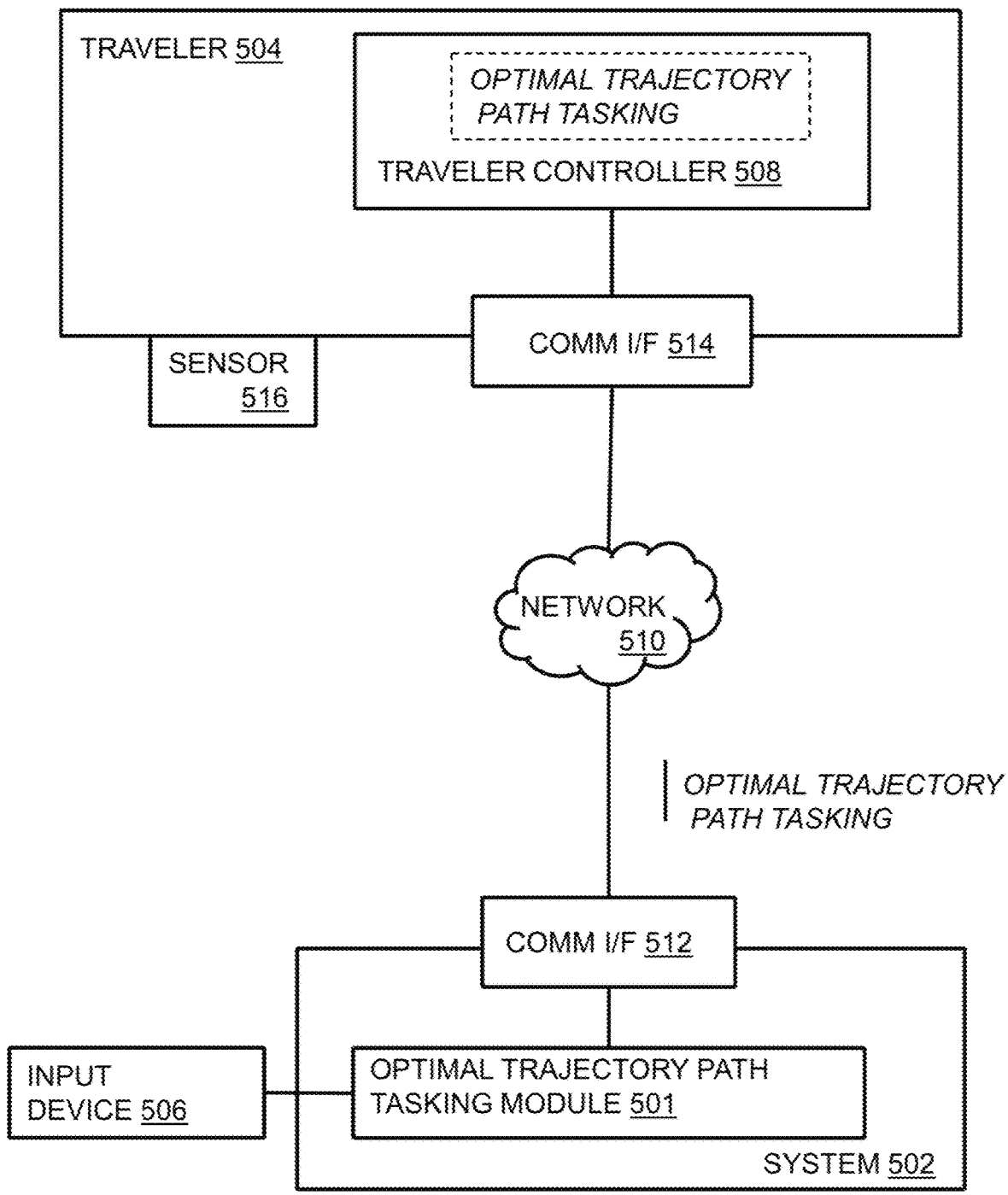
FIG. 5 is a diagram illustrating an optimal trajectory path tasking system generating and providing an optimal trajectory path tasking to a traveler in accordance with embodiments.

FIG. 5 is a diagram 500 illustrating an optimal trajectory path tasking system 502 generating and providing an optimal trajectory path tasking to a traveler 504 in accordance with one embodiment of the invention. A traveler 504 may include, but is not limited to, a UAV, a manned vehicle, a satellite, etc. Optimal trajectory path tasking system 502 includes module 501 stored as computer executable instructions which can be implemented on system 502. Module 501 can be implemented on system 502 using any suitable hardware and/or processor-executed software or processor-executed firmware via one or more processors and associated electronic memory. User inputs to system 502 and module 501 can be input via one or more inputs devices 506 communicatively coupled to system 502. For example, as earlier described, examples of user inputs to system 502 include: a cost objective; one or more user defined constraints: a user defined dynamic model of the sensor and traveler in a state space; one or more user defined attributes of the collection targets in a label space, and a mapping relating the state space to the label space.

Module 501 utilizes the user inputs to generate an optimal trajectory path tasking as earlier described herein, and system 502 communicates the optimal trajectory path tasking to a traveler controller 508, or other guidance system, of a traveler 504. For example, the optimal trajectory path tasking generated by module 501 can be communicated via a communication interface (I/F) 512 of system 502 to a communication I/F 514 of traveler 504 over a network 510 connection. Traveler controller 508 receives the optimal trajectory path tasking and guides the path of traveler 504 in accordance with the optimal trajectory path tasking to allow for collection of data by a sensor 516 of traveler 504.

System 502 may further include standard devices such as display device, a printer, as well as one or more standard input-output (I/O) devices, such as a compact disk (CD) or DVD drive, or other porting device for inputting data to and outputting data from 502. In one embodiment, module 501 is loaded onto system 502 as executable code via an I/O device, such as from a CD. DVD, or other digital communicable form containing module 501, or via a network download. Module 501 can be stored in memory of system 502 and executed on system 502. In some embodiments, system 502 may be coupled to other networks (not shown). In some embodiments, module 501 can be fully or partially implemented on an external network. In one embodiment, module 501 can be embodied as a computer program product in a medium configured to store or transport computer readable code. Some examples of computer program products are CD-ROM discs, DVDs, ROM cards, and computer hard drives.

Further, those skilled in the art will appreciate that one or more elements of the system 502 may be implemented on a distributed system having several nodes, where each portion of the invention may be located on a different node within the distributed system. In one embodiment of the invention, the node corresponds to a computer system. In another embodiment, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Alternatively, the elements of system 502 may be implemented as a stand-alone system that does not use an external network to communicate between elements.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method of navigation, the method comprising:
   by an optimal trajectory path tasking system:
   receiving, by one or more inputs devices, a plurality of user inputs, wherein the plurality of user inputs include at least: a cost objective; one or more user defined system constraints of an uninhabited aerial vehicle (UAV); a user defined dynamic model of a sensor and traveler in a state space; one or more user defined attributes of a collection target in a label space, and a mapping relating the state space to the label space;

generating an optimal trajectory path tasking based at least in part on the plurality of user inputs, further comprising:

constructing a T-graph with vertex data and process dynamics data of a route plan, wherein the vertex data describes one or more target attributes, based at least in part on one or more target locations and wherein the process dynamics data are based at least in part on the system constraints of the UAV;

receiving a state space, from a UAV camera of the UAV, where in the state space is based on a current position and orientation of the UAV camera, and wherein the state space is an operating view of the UAV camera mounted to the UAV;

determining the current position of the UAV, based at least in part on the current position and orientation of the UAV camera to the label space;

defining vertex functionals and edge functionals for cost objectives based on the vertex data and process dynamics data, wherein the vertex functionals describe one or more attribute requirements of the target locations, wherein the one or more attributes are a time at target, and wherein the edge functionals are based in part on the system constraints of the UAV to determine cost requirements of edges between the one or more target attributes, and wherein the system constraints of the UAV are operational constraints of the UAV;

constructing a label space trajectory, based on a solution to a T-graph, wherein the T-graph solution is based on the vertices and process dynamics data, the vertex and edge functionals, and the cost objectives;

solving the T-graph to construct a label space trajectory within the label space for a current location of the UAV, wherein constructing the label space trajectory comprises:

determining waypoints for the label space trajectory such that the UAV (1) travels through one or more target locations and (2) satisfies the one or more attribute requirements of each of the targets;

dynamically calculating travel cost of the waypoints, wherein the travel costs of the waypoints are the cost requirements of each intervening edge; and identifying an optimal label space trajectory, wherein the optimal label space trajectory is based at least in part on minimizing the travel cost objectives; and communicating the optimal trajectory path tasking to the UAV;

by the UAV:
receiving the optimal trajectory path tasking; and
the optimal trajectory path tasking, by navigating through one or more target locations; and collecting data.

2. The method of claim 1, further comprising selecting a traveling salesman problem (TSP) variant for the route plan.

3. The method of claim 2, further comprising a set of k resources wherein each k resource has a limited or otherwise constrained capacity as defined in the system constraints.

4. The method of claim 1, further comprising a set or subset of vertices that are available only between specified clock times.

5. The method of claim 1, further comprising identifying the one or more cost objectives to be optimized in the route plan.

6. The method of claim 1, wherein the T-graph is defined as:

$$(\mathcal{T}_X P) \begin{cases} \text{Minimize} & J[l(\cdot), x(\cdot), u(\cdot), t_0, t_f] \\ \text{Subject to} & \dot{x}(t) = f(x(t), u(t), t) \\ & g(l(t), x(t), t) = 0 \\ & K^m[l(\cdot), x(\cdot), u(\cdot), t_0, t_f] \begin{cases} \leq 0, & \forall m \in N_{\geq 0} \\ = 0, & \forall m \in N_{=0} \end{cases} \\ & (l(t_0), l(t_f)) \in \mathbb{L}^b \subseteq \mathbb{L} \\ & x(t) \in \mathbb{X}(t) \\ & u(t) \in \mathbb{U}(t, x(t)) \end{cases}$$

wherein J is a cost functional for the label space, $\dot{x}$ is a state space that describes dynamics of a traveling salesman problem variant, g is a connexion function between the label space and the state space, $K^m$ are the vertex functionals, $\mathbb{L}^b \subseteq \mathbb{L}$ specifies boundary conditions for the label space trajectory, $x(t) \in \mathbb{X}(t)$ are state variable constraints of the state space, and $u(t) \in \mathbb{U}(t, x(t))$ are state-dependent control constraints.

7. The method of claim 1, wherein the T-graph includes a cost functional defined as a cumulative route execution time, wherein the cumulative route execution time is given as $t_f$, as $t_f - t_o$, or as $\int_{t_o}^{t_f} 1\, dt$, and wherein $t_o$ is an initial clock time and $t_f$ is a final clock time.

8. The method of claim 1, wherein the T-graph includes a cost functional defined as a cumulative route length, wherein the cumulative route length is defined as:

$$J_{dist}[l(\cdot), w(\cdot), t_o, t_f] := \int_{t_o}^{t_f} \|w(t)\|^p dt$$

wherein l is the label space, w is a control variable, t is a time variable and $\|\cdot\|^p$ is a p-norm defined as a Euclidean norm for p=2, as a one-norm for p=1, or as an infinity-norm for p=∞, or p as any real number as selected by a user of the UAV.

9. The method of claim 1, wherein the UAV is configured to expend fuel and the T-graph includes a cost functional defined as:

$$J_{hybrid}[l(\cdot), x(\cdot)), u(\cdot), t_0, t_f] := \\ \alpha(t_f - t_0) + (1 + \alpha) \int_{t_0}^{t_f} f_0(x(t), u(t), t) dt \ \alpha \in [0, 1]$$

wherein l is the label space, x is a state variable, u is a control variable, t is a time variable, and $f_0$ is a fuel function that models a time-varying fuel consumption rate of the UAV.

10. The method of claim 1, wherein the T-graph includes a cost or a constraint functional defined in terms of a per-vertex atomic return functional:

$$R^i[l(\cdot), t_o, t_f] := \int_{t_o}^{t_f} R_a(l(t), L^i(t)) dt$$

wherein l is a label space, $L^i$ is a vertex attribute set (label) of a vertex i, t is a time variable, $t_o$ is an initial clock time, $t_f$ is a final clock time, and $R_a$ is an atomic return function of a vertex i defined by $$R_a(l, L^i(t)) \begin{cases} \neq 0 \text{ if } l \in L^i(t) \\ = 0 \text{ otherwise} \end{cases}.$$

11. The method of claim 1, wherein the T-graph includes a constraint functional defined as a time-on-task functional:

$$T^i[l(\cdot), t_o, t_f] := \int_{t_o}^{t_f} I(l(t), L^i(t)) dt$$

wherein l is a label space, $L^i$ is a vertex attribute set (label), t is a time variable, $t_o$ is an initial clock time, $t_f$ is a final clock time, and I is a Kronecker indicator function defined by $$I(l, L^i(t)) \begin{cases} \neq 1 \text{ if } l \in L^i(t) \\ = 0 \text{ otherwise} \end{cases}.$$

12. The method of claim 1, wherein the T-graph includes a constraint functional defined as a vertex-visit functional:

$$D^i[l(\bullet), t_o, t_f] := 2$$

wherein l is a label space, t is a time variable, $t_o$ is an initial clock time, $t_f$ is a final clock time, as wherein a vertex-visit functional is evaluated as:

$$D^i[l(\cdot), t_o, t_f] := \int_{t_o}^{t_f} |d_t I(l(t), L^i(t))| dt$$

where $L^i$ is a vertex attribute set (label) of a vertex i, and I is a Kronecker indicator function defined by $$I(l, L^i(t)) \begin{cases} \neq 1 \text{ if } l \in L^i(t) \\ = 0 \text{ otherwise} \end{cases}$$

and where $|d_t I(l(t), L(t))| = \delta(t-t_x)$, where $\delta(t-t_x)$ is the Dirac delta function centered at $t=t_x$.

13. The method of claim 1, wherein the T-graph includes a constraint functional defined as a control-walk-indicator functional:

$$W^i[l(\cdot), t_o, t_f] := \begin{cases} 1 \text{ if } T^i[l(\cdot), t_o, t_f] \neq 0 \\ 0 \text{ if } T^i[l(\cdot), t_o, t_f] = 0 \end{cases}$$

wherein l is the label space, $T^i$ is a time-on-task functional of a vertex i, t is a time variable, $t_o$ is an initial clock time, $t_f$ is a final clock time.

14. The method of claim 1, wherein the vertex functionals include at least one functional of a group selected of time-on-task functionals, vertex-visit functionals, atomic return functionals, walk-indicator functionals, degree functionals, and capacity-constraint functionals.

15. The method of claim 6, wherein the T-graph is further defined as:

$$(D\text{-}TSP) \begin{cases} \text{Minimize } J_{dist}[l(\cdot), t_o, t_f] := \int_{t_o}^{t_f} \|i(t)\| dt \\ \text{Subject to } D^i[l(\cdot), t_o, t_f] = 2 \forall i \in N_u \\ l(t_f) = l(t_o) \end{cases}$$

wherein J is a cost functional describing the cumulative route length of a label space trajectory, $D^i$ is a vertex-visit functional of vertex i, l is the label space, and $l(t_o)=l(t_f)$ implies that the label space trajectory is a same point at an initial clock time $t_o$ and at a final clock time $t_f$.

16. The method of claim 6, wherein the T-graph is further defined as:

$$(I\text{-}TSP) \begin{cases} \text{Minimize } J_{dist}[l(\cdot), t_o, t_f] := \int_{t_o}^{t_f} \|i(t)\| dt \\ \text{Subject to } W^i[l(\cdot), t_o, t_f] = 1 \forall i \in N_u \\ l(t_f) = l(t_o) \end{cases}$$

wherein J is a cost functional describing a cumulative route length of a label space trajectory, $W^i$ is a control-walk-indicator functional of vertex i, l is the label space, and $l(t_o)=l(t_f)$ implies that the label space trajectory is a same point at an initial clock time $t_o$ and at a final clock time $t_f$.

17. The method of claim 6, wherein the connexion function connects label variables in the label space to state variables in the state space that define a position and orientation of the UAV.

18. An uninhabited aerial vehicle (UAV) system and an optimal trajectory path tasking navigation system, the systems comprising two or more non-transitory computer-readable mediums storing instructions executable by two or more processors, wherein the instructions comprise instructions to:

by the optimal trajectory path tasking system:
  receiving, by one or more inputs devices, a plurality of user inputs, wherein the plurality of user inputs include at least: a cost objective; one or more user defined system constraints of an uninhabited aerial vehicle (UAV); a user defined dynamic model of a sensor and traveler in a state space; one or more user defined attributes of a collection targets in a label space, and a mapping relating the state space to the label space;
  generating an optimal trajectory path tasking, wherein the optimal trajectory path tasking comprises:
    selecting a traveling salesman problem (TSP) variant for a route plan;
    constructing a T-graph with vertex data and process dynamics data for a route plan, wherein the vertex data describes target attributes, and wherein the process dynamics describes system constraints of UAV, wherein the system constraints of the UAV are based at least in part on an engineering constraint, a resource constraint, an operational constraint, and or a physics constraint;
    receiving a state space from a UAV camera, wherein the state space is based on a current position and orientation the UAV camera, and wherein the state space is an operating view of the camera mounted to the UAV;

determining the current position of the UAV, based at least in part on the current position and orientation of the UAV camera to the label space;

defining vertex functionals and edge functionals for a cost objective based on the vertex data and process dynamics data, wherein the vertex functionals describe attribute requirements of the target, wherein one or more of the target attributes are target locations, and wherein the edge functionals use the system constraints of the process to determine a cost requirements of edges between the target attributes;

using the vertex data and process dynamics data, the vertex functionals and edge functionals, and the cost objectives to construct a T-graph, wherein the T-graph comprises a label space that spatially represents the target attributes;

connecting the label space to the state space based on the position and orientation of the camera to determine a current location of the UAV;

solving the T-graph to construct a label space trajectory within the label space for the current location of the UAV, wherein constructing the label space trajectory comprises:

determining waypoints for the label space trajectory such that the UAV (1) travels through one or more target locations and (2) satisfies the one or more attribute requirements of each of the targets;

dynamically calculating a travel cost as the waypoints are determined by applying the cost requirements to each intervening edge; and minimizing the travel cost according to the cost objectives to identify an optimal label space trajectory;

communicating the optimal trajectory path tasking to the UAV;

by the UAV:
receiving the optimal trajectory path tasking
executing the optimal space trajectory, by navigating through the targets; and
collecting data.

19. The computer-readable medium of claim 18, the executable instructions for further causing the two or more computer processors to a set or subset of vertices that are available only between specified clock times.

20. The computer-readable medium of claim 18, wherein the T-graph is defined as:

$$(\mathcal{T}_x P)\begin{cases} \text{Minimize} & J[l(\cdot), x(\cdot), u(\cdot), t_0, t_f] \\ \text{Subject to} & \dot{x}(t) = f(x(t).u(t), t) \\ & g(l(t), x(t), t) = 0 \\ & K^m[l(\cdot), x(\cdot), u(\cdot), t_0, t_f] \begin{cases} \leq 0, & \forall m \in N_{\geq 0} \\ = 0, & \forall m \in N_{=0} \end{cases} \\ & (l(t_0), l(t_f)) \in \mathbb{L}^b \subseteq \mathbb{L} \\ & x(t) \in \mathbb{X}(t) \\ & u(t) \in \mathbb{U}(t, x(t)) \end{cases}$$

wherein J is a cost functional for the label space, $\dot{x}$ is a state space that describes dynamics of a traveling salesman problem variant, g is a connexion function between the label space and the state space, $K^m$ are the vertex functionals, $\mathbb{L}^b \subseteq \mathbb{L}$ specifies boundary conditions for the label space trajectory, $x(t) \in \mathbb{X}(t)$ are state variable constraints of the state space, and $u(t) \in \mathbb{U}(t, x(t))$ are state-dependent control constraints.

21. The computer-readable medium of claim 18, wherein the T-graph includes a cost functional defined as a cumulative route execution time, wherein the cumulative route execution time is given as $$t_f, \text{ as } t_f - t_o, \text{ or as } \int_{t_o}^{t_f} 1 dt,$$

and wherein $t_o$ is an initial clock time and $t_f$ is a final clock time.

22. The computer-readable medium of claim 18, wherein the T-graph includes a cost functional defined as a cumulative route length, wherein the cumulative route length is defined as:

$$J_{dist}[l(\cdot), w(\cdot), t_o, t_f] := \int_{t_o}^{t_f} \|w(t)\|^p dt$$

wherein l is the label space, w is a control variable, t is a time variable and $\|\cdot\|^p$ is a p-norm defined as a Euclidean norm for p=2, as a one-norm for p=1, or as an infinity-norm for p=∞, or p as any real number as selected by a user of the UAV.

23. The computer-readable medium of claim 18, wherein the UAV is configured to expend fuel and the T-graph includes a cost functional defined as:

$$J_{hybrid}[l(\cdot), x(\cdot), u(\cdot), t_0, t_f] := \alpha(t_f - t_0) + (1 - \alpha)\int_{t_o}^{t_f} f_0(x(t), u(t), t) dt$$

$$\alpha \in [0, 1]$$

wherein l is the label space, x is a state variable, u is a control variable, t is a time variable, and $f_0$ is a fuel function that models a time-varying fuel consumption rate of the UAV.

24. The computer-readable medium of claim 18, wherein the vertex functionals include at least one functional of a group selected of time-on-task functionals, vertex-visit functionals, atomic return functionals, walk-indicator functionals, degree functionals, and capacity-constraint functionals.

25. The computer-readable medium of claim 20, wherein the T-graph is further defined as:

$$(D-TSP)\begin{cases} \text{Minimize } J_{dist}[l(\cdot), t_o, t_f] := \int_{t_o}^{t_f} \|i(t)\| dt \\ \text{Subject to } D^i[l(\cdot), t_o, t_f] = 2 \forall i \in N_u \\ l(t_f) = l(t_o) \end{cases}$$

wherein J is a cost functional describing the cumulative route length of a label space trajectory, $D^i$ is a vertex-visit functional of vertex i, l is the label space, and $l(t_o)=l(t_f)$ implies that the label space trajectory is a same point at an initial clock time $t_o$ and at a final clock time $t_f$.

26. The computer-readable medium of claim 20, wherein the T-graph is further defined as:

$$(I\text{-}TSP)\begin{cases} \text{Minimize } J_{dist}[l(\cdot), t_o, t_f] := \int_{t_o}^{t_f} \|\dot{l}(t)\| dt \\ \text{Subject to } W^i[l(\cdot), t_o, t_f] = 1 \forall\, i \in N_u \\ \qquad\qquad l(t_f) = l(t_o) \end{cases}$$

wherein J is a cost functional describing a cumulative route length of a label space trajectory, $W^i$ is a control-walk-indicator functional of vertex i, l is the label space, and $l(t_o)=l(t_f)$ implies that the label space trajectory is a same point at an initial clock time $t_o$ and at a final clock time $t_f$.

27. A route planning and optimization system comprising: an optimal trajectory path tasking system and an uninhabited aerial vehicle (UAV);

the optimal trajectory path tasking system comprising:

one or more inputs devices, the inputs devices being communicatively coupled to the optimal trajectory path tasking system, wherein a plurality of user inputs include at least: a cost objective; one or more user defined system constraints of an uninhabited aerial vehicle (UAV); a user defined dynamic model of a sensor and traveler in a state space; one or more user defined attributes of a collection target in a label space, and a mapping relating the state space to the label space;

an optimal trajectory path tasking module configured to generate the optimal label space trajectory based at least in part on the one or more user inputs;

an optimal trajectory path tasking system communication interface configured to communicated to a communication interface of a traveler controller;

a storage device operatively connected to a processor, the storage device to store vertex data and process dynamics data for a route plan, wherein the vertex data describes target attributes, and wherein the process dynamics describes system constraints of the UAV for executing a route plan;

the UAV comprising:

a UAV communication interface configured to communicated with a traveler controller;

a storage device operatively connected to the traveler controller of the UAV;

a storage device configured to store the optimal trajectory path tasking;

a camera, wherein the camera is configured to collect an operating view of the UAV as a state space; and one or more position sensors, whereas the one or more position sensors are configured to determine a position and orientation of the camera;

wherein the optimal trajectory path tasking module is configured to define vertex functionals and edge functionals for cost objectives based on the vertex data and process dynamics data, wherein the vertex functionals describes attribute requirements of the target attributes, wherein one or more of the target attributes are target locations, and wherein the edge functionals use the system constraints of the UAV to determine cost requirements of edges between the target attributes;

use the vertices and process dynamics data, the vertex and edge functionals, and the cost objectives to construct a T-graph, wherein the T-graph comprises a label space that spatially represents the target attributes, and wherein the T-graph is defined as:

$$(\mathcal{T}_xP)\begin{cases} \text{Minimize } J[l(\cdot), x(\cdot), u(\cdot), t_0, t_f] \\ \text{Subject to } \dot{x}(t) = f(x(t).u(t), t) \\ \qquad\qquad g(l(t), x(t), t) = 0 \\ \qquad\qquad K^m[l(\cdot), x(\cdot), u(\cdot), t_0, t_f]\begin{cases} \leq 0, & \forall\, m \in N_{\geq 0} \\ = 0, & \forall\, m \in N_{=0} \end{cases} \\ \qquad\qquad (l(t_0), l(t_f)) \in \mathbb{L}^b \subseteq \mathbb{L} \\ \qquad\qquad x(t) \in \mathbb{X}(t) \\ \qquad\qquad u(t) \in \mathbb{U}(t, x(t)) \end{cases}$$

wherein J is a cost functional for the label space, $\dot{x}$ is the state space of the UAV that describes dynamics of a traveling salesman problem variant, g is a connexion function between the label space and the state space, $K^m$ are the vertex functionals, $\mathbb{L}^b \subseteq \mathbb{L}$ specifies boundary conditions for the label space trajectory, $x(t) \in \mathbb{X}(t)$ are state variable constraints of the state space, and $u(t) \in \mathbb{U}(t,x(t))$ are state-dependent control constraints;

connect the label space to the state space based on the position and orientation of the camera to determine a current location of the UAV;

solve the T-graph to construct a label space trajectory within the label space for the current location of the UAV, wherein constructing the label space trajectory comprises:

determining waypoints for the label space trajectory such that the UAV (1) travels through one or more target locations and (2) satisfies the attribute requirements of each of the one or more target locations;

dynamically calculating travel cost as the waypoints are determined by applying the cost requirements to each intervening edge; and minimizing the travel cost according to the cost objectives to identify an optimal label space trajectory;

transmitting the state space;

receiving by the traveler controller of the UAV the optimal label space trajectory; and the traveler controller of the UAV executing the optimal space trajectory to remotely navigate the UAV through the one or more target locations.

28. The system of claim 27, wherein the vertex functionals include at least one functional of a group selected of time-on-task functionals, vertex-visit functionals, atomic return functionals, walk-indicator functionals, degree functionals, and capacity-constraint functionals.

29. The system of claim 27, wherein the T-graph is further defined as:

$$(D\text{-}TSP)\begin{cases} \text{Minimize } J_{dist}[l(\cdot), t_o, t_f] := \int_{t_o}^{t_f} \|\dot{l}(t)\| dt \\ \text{Subject to } D^i[l(\cdot), t_o, t_f] = 2 \forall\, i \in N_u \\ \qquad\qquad l(t_f) = l(t_o) \end{cases}$$

wherein J is a cost functional describing the cumulative route length of a label space trajectory, $D^i$ is a vertex-visit functional of vertex i, l is the label space, and $l(t_o)=l(t_f)$ implies that the label space trajectory is a same point at an initial clock time $t_o$ and at a final clock time $t_f$.

30. The system of claim 27, wherein the T-graph is further defined as:

$$(I\text{-}TSP) \begin{cases} \text{Minimize } J_{dist}[l(\cdot), t_o, t_f] := \int_{t_o}^{t_f} \|i(t)\| dt \\ \text{Subject to } W^i[l(\cdot), t_o, t_f] = 1 \, \forall \, i \in N_u \\ \qquad\qquad l(t_f) = l(t_o) \end{cases} \quad 5$$

wherein J is a cost functional describing a cumulative route length of a label space trajectory, $W^i$ is a control-walk-indicator functional of vertex i, l is the label space, and $l(t_o)=l(t_f)$ implies that the label space trajectory is a same point at an initial clock time $t_o$ and at a final clock time $t_f$.

* * * * *